(12) United States Patent
Yamamoto

(10) Patent No.: US 11,749,222 B2
(45) Date of Patent: *Sep. 5, 2023

(54) ACTIVE MATRIX SUBSTRATE AND DISPLAY DEVICE

(71) Applicant: Sharp Kabushiki Kaisha, Sakai (JP)

(72) Inventor: Kaoru Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 351 days.

This patent is subject to a terminal disclaimer.

(21) Appl. No.: 16/642,090

(22) PCT Filed: Aug. 17, 2018

(86) PCT No.: PCT/JP2018/030540
§ 371 (c)(1),
(2) Date: Feb. 26, 2020

(87) PCT Pub. No.: WO2019/044546
PCT Pub. Date: Mar. 7, 2019

(65) Prior Publication Data
US 2020/0211489 A1 Jul. 2, 2020

(30) Foreign Application Priority Data

Aug. 29, 2017 (JP) .................................. 2017-164156

(51) Int. Cl.
*G09G 3/36* (2006.01)
(52) U.S. Cl.
CPC ......... *G09G 3/3648* (2013.01); *G09G 3/3674* (2013.01); *G09G 2310/0297* (2013.01)

(58) Field of Classification Search
None
See application file for complete search history.

(56) References Cited

U.S. PATENT DOCUMENTS 10,622,437 B2 * 4/2020 Yamamoto .......... H01L 27/3276
10,896,656 B2 * 1/2021 Yamamoto ............ H01L 27/124
(Continued)

FOREIGN PATENT DOCUMENTS

| JP | 2010-102266 A | 5/2010 |
| JP | 2012-134475 A | 7/2012 |

(Continued)

*Primary Examiner* — Benjamin X Casarez
(74) *Attorney, Agent, or Firm* — KEATING & BENNETT, LLP

(57) ABSTRACT

The active matrix substrate includes a demultiplexer circuit disposed in a peripheral region. Unit circuits of the demultiplexer circuit each distribute a display signal from one signal output line to n source bus lines (n: two or greater). Each unit circuit includes n branch lines and n switching TFTs configured to perform individual on/off control of electrical connections of the branch lines to the source bus lines. The demultiplexer circuit includes a plurality of boost circuits each configured to boost a voltage applied to a gate electrode of a corresponding one of the switching TFTs. Each boost circuit includes: a set-and-reset unit configured to perform set operation of pre-charging a node connected to the gate electrode and reset operation of resetting the potential of the node at different timings; and a boost unit configured to perform boost operation of boosting the potential of the node pre-charged by the set operation.

23 Claims, 21 Drawing Sheets

(56) References Cited

U.S. PATENT DOCUMENTS

| | | | |
|---|---|---|---|
| 11,145,268 B2* | 10/2021 | Yamamoto | G02F 1/134372 |
| 2003/0063048 A1* | 4/2003 | Nakano | G09G 3/3648 |
| | | | 345/55 |
| 2008/0303749 A1* | 12/2008 | Cassidy | G09G 3/3688 |
| | | | 345/55 |
| 2012/0138922 A1 | 6/2012 | Yamazaki et al. | |
| 2013/0038518 A1 | 2/2013 | Tagawa et al. | |
| 2013/0320334 A1 | 12/2013 | Yamazaki et al. | |
| 2014/0286076 A1 | 9/2014 | Aoki et al. | |
| 2015/0279480 A1* | 10/2015 | Murakami | G09G 3/3677 |
| | | | 345/100 |
| 2016/0093260 A1* | 3/2016 | Watsuda | G09G 3/3688 |
| | | | 345/87 |
| 2016/0293093 A1* | 10/2016 | Seo | G09G 3/20 |
| 2016/0329025 A1* | 11/2016 | Park | G09G 3/3688 |
| 2017/0243559 A1* | 8/2017 | Xi | G09G 5/003 |
| 2018/0301104 A1* | 10/2018 | Hao | G09G 3/3685 |

FOREIGN PATENT DOCUMENTS

| | | |
|---|---|---|
| JP | 2014-007399 A | 1/2014 |
| JP | 2014-209727 A | 11/2014 |
| WO | 2011/118079 A1 | 9/2011 |

\* cited by examiner

ACTIVE MATRIX SUBSTRATE AND DISPLAY DEVICE

TECHNICAL FIELD

The present invention relates to an active matrix substrate and specifically, to an active matrix substrate including a demultiplexer circuit. Moreover, the present invention also relates to a display device including the active matrix substrate.

BACKGROUND ART

An active matrix substrate used for, for example, a liquid crystal display device includes a display region provided with a plurality of pixels and a region (non-display region or frame region) other than the display region. In the display region, a switching element such as a Thin Film Transistor (hereinafter referred to as a "TFT") is provided for each pixel. Widely used examples of such a switching element include a TFT including an amorphous silicon film as an active layer (hereinafter referred to as an "amorphous silicon TFT") and a TFT including a polycrystalline silicon film as an active layer (hereinafter referred to as a "polycrystalline silicon TFT").

It has been proposed to use, as a material for the active layer of the TFT, an oxide semiconductor in place of amorphous silicon or polycrystalline silicon. Such a TFT is referred to as an "oxide semiconductor TFT". The oxide semiconductor has mobility higher than that of the amorphous silicon. Thus, the oxide semiconductor TFT is configured to operate at a higher speed than the amorphous silicon TFT.

In the non-display region of the active matrix substrate, a peripheral circuit such as a drive circuit may be monolithically (integrally) formed. Monolithically forming the drive circuit realizes narrowing of the non-display region (frame narrowing) and a cost reduction by simplification of a mounting step. For example, in the non-display region, a gate driver circuit is monolithically formed, and a source driver circuit may be mounted by using a Chip on Glass (COG) technology.

It is proposed to monolithically form a demultiplexer (DEMUX) circuit, such as a Source Shared Driving (SSD) circuit in addition to the gate driver in a device, such as a smartphone, which strongly demands frame narrowing (e.g., PTL 1 and PTL 2). The SSD circuit is a circuit for distributing a video signal from one video signal line connected to a corresponding one of terminals of a source driver to a plurality of source lines. Mounting the SSD circuit enables a further reduction of a region (terminal section and line formation region) which is part of the non-display region and in which a terminal section and lines are disposed. Moreover, the number of outputs from the source driver decreases, which enables a circuit scale to be reduced, and therefore, it is possible to reduce the cost of the driver IC.

Peripheral circuits such as the drive circuit and the SSD circuit include TFTs. In the present specification, a TFT disposed as a switching element in each pixel in the display region is referred to as a "pixel TFT", and TFTs included in peripheral circuits are referred to as "circuit TFTs". Moreover, of the circuit TFTs, a TFT used as a switching element in the DEMUX circuit (SSD circuit) is referred to as a "DEMUX circuit TFT".

CITATION LIST

Patent Literature

PTL 1: International Publication No. WO 2011/118079
PTL 2: Japanese Unexamined Patent Application Publication No. 2010-102266

SUMMARY OF INVENTION

Technical Problem

It can be said from the perspective of a fabrication process that in an active matrix substrate which adopts an oxide semiconductor TFT as a pixel TFT, the DEMUX circuit TFT is preferably also an oxide semiconductor TFT adopting the same oxide semiconductor membrane as the pixel TFT.

It is, however, difficult to form a DEMUX circuit by adopting the oxide semiconductor TFT, and therefore, as the DEMUX circuit TFT, a polycrystalline silicon TFT has been adopted. The reason for this is as follows.

The mobility of the oxide semiconductor is lower than that of the polycrystalline silicon by about one digit. Therefore, the current drive force of the oxide semiconductor TFT is less than that of the polycrystalline silicon TFT. Thus, when the oxide semiconductor is adopted to form the DEMUX circuit TFT, the size of the TFT has to be larger (channel width has to be larger) or the drive voltage has to be higher than when the polycrystalline silicon is used. When the size of the TFT is increased, the gate capacitance load increases, and thereby, the drive power of the DEMUX circuit increases. On the other hand, when the drive voltage of the TFT is increased, the drive power of the DEMUX circuit increases.

Note that as described later, also when the polycrystalline silicon TFT is used as the DEMUX circuit TFT, adopting only the PMOS process (i.e., polycrystalline silicon TFT including only the PMOS transistor) may lead to the same problem.

In view of the foregoing, it is an object of the present invention to reduce drive power of an active matrix substrate including a demultiplexer circuit.

Solution to Problem

An active matrix substrate according to an embodiment of the present invention is an active matrix substrate including a display region having a plurality of pixel regions and a peripheral region located in a periphery of the display region, the active matrix substrate including: a substrate; a plurality of gate bus lines and a plurality of source bus lines on the substrate; a source driver disposed in the peripheral region and including a plurality of output terminals; a plurality of signal output lines each connected to a corresponding one of the plurality of output terminals of the source driver; and a demultiplexer circuit which includes a plurality of unit circuits supported by the substrate and which is disposed in the peripheral region, wherein each of the plurality of unit circuits of the demultiplexer circuit distributes a display signal from one signal output line of the plurality of signal output lines to n source bus lines of the plurality of source bus lines, where n is an integer larger than or equal to 2, each of the plurality of unit circuits includes n branch lines connected to the one signal output line, and n switching TFTs each connected to a corresponding one of the n branch lines, the n switching TFTs being configured to perform individual on/off control of electrical connections of the n branch lines to the n source bus lines, the demultiplexer circuit further includes a plurality of boost circuits each configured to boost a voltage applied to a gate electrode of a corresponding one of the n switching TFTs, and each of the plurality of boost circuits includes: a set-and-reset unit configured to perform a set operation of pre-charging a node connected to the gate electrode and a reset operation of resetting potential of the node at different timings, and a boost unit configured to perform a boost operation of boosting the potential of the node pre-charged by the set operation performed by the set-and-reset unit.

In an embodiment, the demultiplexer circuit includes: a first drive signal line and a second drive signal line via which a first drive signal and a second drive signal are respectively supplied to the set-and-reset unit; and a third drive signal line via which a third drive signal is supplied to the boost unit.

In an embodiment, the set-and-reset unit includes at least one setting-and-resetting TFT having a gate electrode connected to the second drive signal line, a source electrode, and a drain electrode, one of the source electrode and the drain electrode being connected to the first drive signal line, and the other of the source electrode and the drain electrode being connected to the node, and the boost unit includes a boosting capacitive element having a first capacitance electrode connected to the third drive signal line and a second capacitance electrode connected to the node.

In an embodiment, the set-and-reset unit includes the at least one setting-and-resetting TFT including only one setting-and-resetting TFT.

In an embodiment, the set-and-reset unit includes the at least one setting-and-resetting TFT including a plurality of setting-and-resetting TFTs, the setting-and-resetting TFTs being connected in series to each other.

In an embodiment, the first drive signal, the second drive signal, and the third drive signal each have a periodic waveform including a change from a low level to a high level and a change from the high level to the low level, and the set operation is performed when both the first drive signal and the second drive signal are at the high level, the boost operation is performed when the third drive signal is at the high level, and the reset operation is performed when the first drive signal is at the low level and the second drive signal is at the high level.

In an embodiment, the n switching TFTs included in each of the plurality of unit circuits include a first switching TFT and a second switching TFT which are brought into an ON state at different timings in one horizontal scan period, and the plurality of boost circuits include a first boost circuit connected to the first switching TFT and a second boost circuit connected to the second switching TFT.

In an embodiment, the first drive signal line for the first boost circuit serves also as the second drive signal line for the second boost circuit, and the first drive signal line for the second boost circuit serves also as the second drive signal line for the first boost circuit.

In an embodiment, within a time period during which the boost operation is performed by the boost unit of the first boost circuit, the set operation is performed by the set-and-reset unit of the second boost circuit.

In an embodiment, the first drive signal, the second drive signal, and the third drive signal each have a periodic waveform including a change from a low level to a high level and a change from the high level to the low level, and one period of the periodic waveform is a time corresponding to one horizontal scan period.

In an embodiment, the first drive signal, the second drive signal, and the third drive signal each have a periodic waveform including a change from a low level to a high level and a change from the high level to the low level, and one period of the periodic waveform is a time corresponding to two horizontal scan periods.

In an embodiment, each of the plurality of boost circuits performs, prior to the reset operation, pull-down operation of pulling down the potential of the node boosted by the boost operation to the potential achieved when the node is pre-charged by the set operation.

In an embodiment, the n switching TFTs included in each of the plurality of unit circuits are two switching TFTs, and the plurality of boost circuits each include two boost circuits each of which is connected to a corresponding one of the two switching TFTs.

In an embodiment, the n switching TFTs included in each of the plurality of unit circuits are two switching TFTs, the two switching TFTs are a first switching TFT and a second switching TFT which are brought into an ON state at different timings in one horizontal scan period, and the plurality of boost circuits include a first boost circuit commonly connected to the first switching TFTs of two unit circuits of the plurality of unit circuits and a second boost circuit commonly connected to the second switching TFTs of the two unit circuits.

In an embodiment, the n switching TFTs included in each of the plurality of unit circuits are two switching TFTs, the two switching TFTs are a first switching TFT and a second switching TFT which are brought into an ON state at different timings in one horizontal scan period, and the plurality of boost circuits include a first boost circuit commonly connected to the first switching TFTs of three or more unit circuits of the plurality of unit circuits and a second boost circuit commonly connected to the second switching TFTs of the three or more unit circuits.

In an embodiment, the n switching TFTs included in each of the plurality of unit circuits are three switching TFTs, each of the plurality of unit circuits includes three boost circuits of the plurality of boost circuits, and each of the three boost circuits is connected to a corresponding one of the three switching TFTs.

In an embodiment, the n switching TFTs included in each of the plurality of unit circuits are three switching TFTs, the three switching TFTs are a first switching TFT, a second switching TFT, and a third switching TFT which are brought into an ON state at different timings in one horizontal scan period, and the plurality of boost circuits include a first boost circuit commonly connected to the first switching TFTs of two unit circuits of the plurality of unit circuits, a second boost circuit commonly connected to the second switching TFTs of the two unit circuits, and a third boost circuit commonly connected to the third switching TFTs of the two unit circuits.

In an embodiment, the n switching TFTs included in each of the plurality of unit circuits are three switching TFTs, the three switching TFTs are a first switching TFT, a second switching TFT, and a third switching TFT which are brought into an ON state at different timings in one horizontal scan period, and the plurality of boost circuits include a first boost circuit commonly connected to the first switching TFTs of three or more unit circuits of the plurality of unit circuits, a second boost circuit commonly connected to the second switching TFTs of the three or more unit circuits, and a third boost circuit commonly connected to the third switching TFTs of the three or more unit circuits.

In an embodiment, the demultiplexer circuit further includes a plurality of clear circuits each connected to a corresponding one of the plurality of boost circuits and each configured to initialize the corresponding one of the plurality of boost circuits at a prescribed timing.

In an embodiment, each of the plurality of clear circuits includes a clearing TFT including a gate electrode to which a clear signal is supplied, and a source electrode and a drain electrode, one of the source electrode and the drain electrode being connected to the node, and the other of the source electrode and the drain electrode being connected to the first drive signal line.

In an embodiment, the plurality of boost circuits include two or more boost circuits which are driven at the same timing, and the demultiplexer circuit includes a first drive signal line group via which a drive signal group for driving some boost circuits of the two or more boost circuits is supplied and a second drive signal line group via which a drive signal group for driving some other boost circuits of the two or more boost circuits is supplied, the second drive signal line group being different from the first drive signal line group.

In an embodiment, each of the n switching TFTs includes an oxide semiconductor layer as an active layer.

In an embodiment, the oxide semiconductor layer includes an In—Ga—Zn—O-based semiconductor.

In an embodiment, the In—Ga—Zn—O-based semiconductor includes a crystalline portion.

In an embodiment, each of the n switching TFTs is a PMOS transistor including a polycrystalline silicon semiconductor layer as an active layer.

A display device according to an embodiment of the present invention includes the active matrix substrate having any one of the above-described structures.

Advantageous Effects of Invention

According to the embodiment of the present invention, it is possible to reduce drive power of an active matrix substrate including a demultiplexer circuit.

DESCRIPTION OF EMBODIMENTS

Embodiments of the present invention will be described below with reference to the drawings. Note that the present invention is not limited to the following embodiments.

First Embodiment

Figure 1:
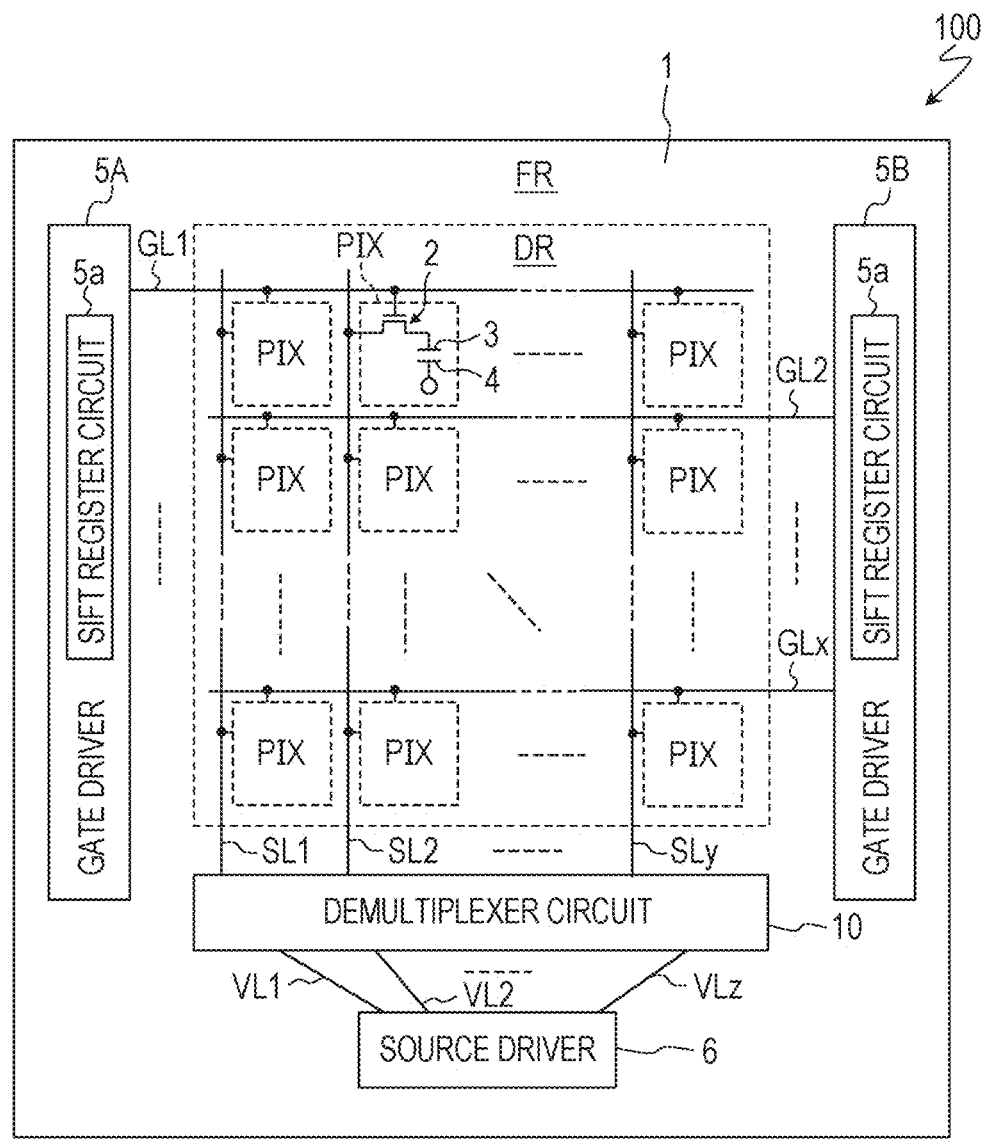
FIG. 1 is a view schematically illustrating an example of a plane structure of an active matrix substrate 100 of a first embodiment.

FIG. 1 is a view schematically illustrating an example of a plane structure of an active matrix substrate 100 of the present invention. As illustrated in FIG. 1, the active matrix substrate 100 includes a display region DR and a peripheral region FR.

The display region DR includes a plurality of pixel regions PIX. The pixel regions PIX are regions corresponding to pixels of a display device. In the following description, the pixel regions PIX are also sometimes referred to simply as "pixels". The plurality of pixel regions PIX are arranged in a matrix form including a plurality of rows and a plurality of columns. The plurality of pixel regions PIX arranged in the matrix form define the display region DR.

The peripheral region FR is located in the periphery of the display region DR. The peripheral region FR is a region which does not contribute to displaying and which is also referred to as a "non-display region" or a "frame region".

The active matrix substrate 100 includes components supported by a substrate 1. The substrate 1 is, for example, a glass substrate.

On the substrate 1, a plurality of gate bus lines (scan lines) GL and a plurality of source bus lines (signal lines) SL are provided. Each of the plurality of gate bus lines GL extends along a row direction. Each of the plurality of source bus lines SL extends along a column direction. In FIG. 1, the gate bus lines GL in a first row, a second row, . . . an xth row are respectively denoted by "GL1", "GL2", . . . "GLx", and the source bus lines SL in a first column, a second column, . . . a yth column are respectively denoted by "SL1", "SL2", . . . "SLy".

Typically, a region surrounded by two gate bus lines GL adjacent to each other and two source bus lines SL adjacent to each other is the pixel region PIX. Each pixel region PIX includes a thin film transistor 2 and a pixel electrode 3.

The thin film transistor 2 is also referred to as a "pixel TFT". The thin film transistor 2 has a gate electrode and a source electrode respectively connected to a corresponding one of the gate bus lines GL and a corresponding one of the source bus lines SL. The thin film transistor 2 has a drain electrode connected to the pixel electrode 3. When the active matrix substrate 100 is adopted in a liquid crystal display device in a lateral electric field mode such as a Fringe Field Switching (FFS) mode, the active matrix substrate 100 is provided with an electrode (common electrode) 4 common to the plurality of pixel regions PIX. When the active matrix substrate 100 is adopted in a liquid crystal display device in a vertical electric field mode, the common electrode 4 is provided on a counter substrate disposed to face the active matrix substrate 100 via a liquid crystal layer.

In the peripheral region FR, gate drivers (scan line drive circuits) 5A and 5B configured to drive the gate bus lines GL, a source driver (signal line drive circuit) 6 configured to drive the source bus lines SL, and a demultiplexer (DEMUX) circuit 10 are disposed. The DEMUX circuit 10 functions as a SSD circuit configured to drive the source bus lines SL in a time-division manner. In the present embodiment, the gate drivers 5A and 5B and the DEMUX circuit 10 are integrally (monolithically) formed on the substrate 1, and the source driver 6 is mounted (e.g., mounted by the COG technology) on the substrate 1.

In the example shown in the figure, the gate driver 5A for driving the gate bus lines GL in the odd rows is disposed on the left of the display region DR, and the gate driver 5B for driving the gate bus lines GL in the even rows is disposed on the right of the display region DR. The gate driver 5A has a plurality of output terminals (not shown) each connected to a corresponding one of the gate bus lines GL in the odd rows. Moreover, the gate driver 5B has a plurality of output terminals (not shown) each connected to a corresponding one of the gate bus lines GL in the even rows. Each of the gate drivers 5A and 5B includes a shift register circuit 5a.

The source driver 6 is disposed on a lower side of the display region DR, and the DEMUX circuit 10 is disposed between the source driver 6 and the display region DR. The source driver 6 includes a plurality of output terminals (not shown). In an area located between the source driver 6 and the DEMUX circuit 10, a plurality of signal output lines (video signal lines) VL are provided. Each of the plurality of signal output lines VL is connected to a corresponding one of the plurality of output terminals of the source driver 6. In FIG. 1, first, second, . . . zth signal output lines VL are respectively denoted by "VL1", "VL2", . . . "VLz".

Figure 2:
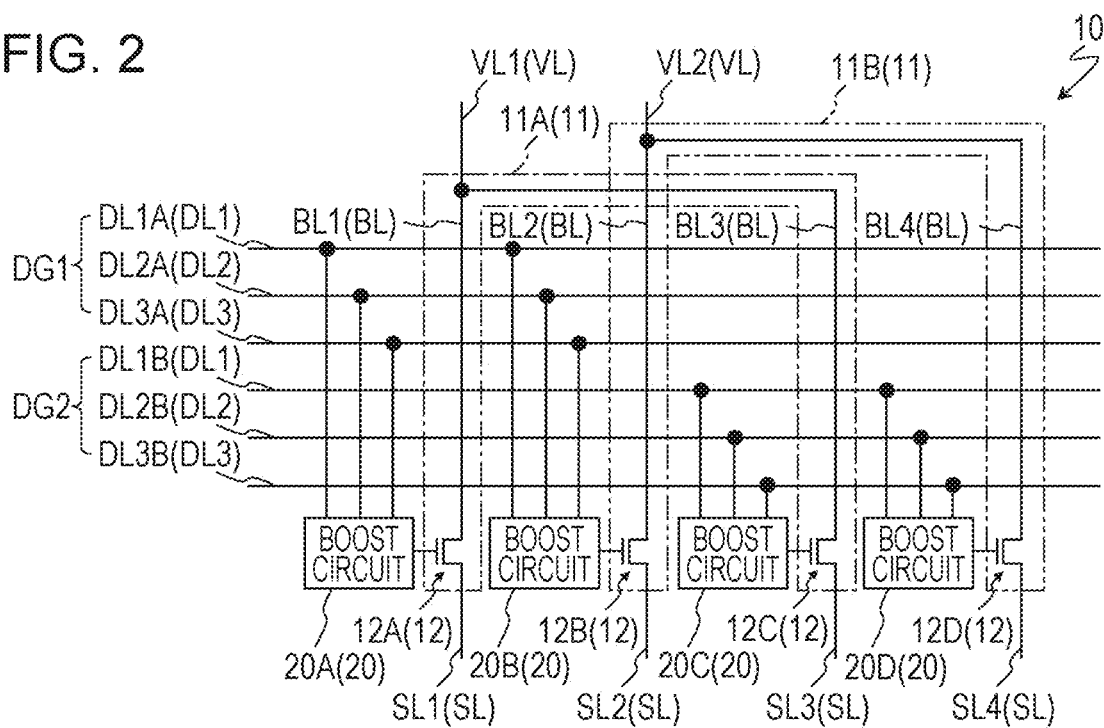
FIG. 2 is a view illustrating an example of a configuration of a DEMUX circuit 10 included in the active matrix substrate 100.

The DEMUX circuit 10 distributes a display signal supplied from one signal output line VL to two or more source bus lines SL. With reference to FIG. 2, the DEMUX circuit 10 will be described in further detail below. FIG. 2 is a view illustrating an example of a configuration of the DEMUX circuit 10.

As illustrated in FIG. 2, the DEMUX circuit 10 includes a plurality of unit circuits 11 supported by the substrate 1. Each of the plurality of unit circuits 11 distributes a display signal from one signal output line VL to n source bus lines SL (n is an integer larger than or equal to 2). FIG. 2 shows a case where n=2, that is, a case where each unit circuit 11 distributes a display signal from one signal output line VL to two source bus lines SL. FIG. 2 shows two unit circuits 11. One unit circuit (hereinafter also referred to as a "first unit circuit") 11A of the two unit circuits 11 distributes a display signal from the signal output line VL1 to the source bus lines SL1 and SL3, and the other unit circuit (hereinafter also referred to as a "second unit circuit") 11B of the two unit circuits 11 distributes a display signal from the signal output line VL2 to the source bus lines SL2 and SL4.

Each unit circuit 11 includes n (here, two) branch lines BL and n (here, two) switching TFTs 12.

The two branch lines BL of each unit circuit 11 are connected to one signal output line VL. Moreover, each of the two switching TFTs 12 of each unit circuit 11 is connected to a corresponding one of the two branch lines BL. The two switching TFTs 12 individually (independently) perform on/off control of electrical connections of the two branch lines BL to the two source bus lines SL. In the present embodiment, each of the two switching TFTs 12 includes, as an active layer, an oxide semiconductor layer (i.e., an oxide semiconductor TFT).

Of two switching TFTs 12A and 12C of the first unit circuit 11A, the switching TFT 12A performs on/off control of an electrical connection of a branch line BL1 to the source bus line SL1, and the switching TFT 12C performs on/off control of an electrical connection of a branch line BL3 to the source bus line SL3. The switching TFT 12A has a source electrode and drain electrode respectively connected to the branch line BL1 and the source bus line SL1, and the switching TFT 12C has a source electrode and a drain electrode respectively connected to the branch line BL3 and the source bus line SL3.

Of two switching TFTs 12B and 12D of the first unit circuit 11B, the switching TFT 12B performs on/off control of an electrical connection of a branch line BL2 to the source bus line SL2, and the switching TFT 12D performs on/off control of an electrical connection of a branch line BL4 to the source bus line SL4. The switching TFT 12B has a source electrode and drain electrode respectively connected to the branch line BL2 and the source bus line SL2, and the switching TFT 12D has a source electrode and a drain electrode respectively connected to the branch line BL4 and the source bus line SL4.

As illustrated in FIG. 2, the DEMUX circuit 10 of the present embodiment further includes a plurality of boost circuits 20 configured to boost a voltage to be applied to the gate electrodes of n (here, two) switching TFTs 12 of each unit circuit 11. In an example shown in FIG. 2, the boost circuits 20 are connected to the switching TFTs 12 on a one-to-one basis. Specifically, gate electrodes of the switching TFTs 12A, 12B, 12C, and 12D are respectively connected to output sides of boost circuits 20A, 20B, 20C, and 20D.

In the example shown in FIG. 2, each boost circuit 20 is driven with a drive signal group supplied via a first drive signal line DL1, a second drive signal line DL2, and a third drive signal line DL3. In the following description, a drive signal supplied via the first drive signal line DL1 is sometimes also referred to as a "first drive signal", a drive signal supplied via the second drive signal line DL2 is sometimes also referred to as a "second drive signal", and a drive signal supplied via the third drive signal line DL3 is sometimes also referred to as a "third drive signal". As described in detail later, in accordance with amplitudes of the first drive signal, the second drive signal, and the third drive signal, the boost circuit 20 boosts a voltage to increase the driving amplitude of a gate potential of the switching TFT 12.

In the example shown in FIG. 2, two systems of drive signal line groups DG1 and DG2 are provided. The boost circuits 20A and 20B are driven by a first drive signal line DL1A, a second drive signal line DL2A, and a third drive signal line DL3A of the drive signal line group DG1 of the drive signal line groups DG1 and DG2. Moreover, the boost circuits 20C and 20D are driven by a first drive signal line DL1B, a second drive signal line DL2B, and a third drive signal line DL3B of the drive signal line group DG2 of the drive signal line groups DG1 and DG2.

As described above, in the active matrix substrate 100 of the present embodiment, the DEMUX circuit 10 includes the boost circuit 20 configured to boost a voltage to be applied to the gate electrode of the switching TFT 12, and therefore, it is possible to increase an effective drive voltage of the DEMUX circuit 10. This enables a drive signal having a relatively small amplitude to drive the DEMUX circuit 10, and therefore, it is possible to reduce power consumption due to charging and discharging of the drive signal. Moreover, the boost circuit 20 enables a voltage (drive voltage) which is to be applied to the gate electrode of the switching TFT 12 to be increased, and therefore, it is possible to reduce resistance (on-resistance) of the switching TFT 12 at the time of selection so as to increase charging capacity. Moreover, it is possible to increase the drive voltage, and therefore, it is also possible to reduce the size of the switching TFT 12. This enables the layout size of the DEMUX circuit 10 to be reduced, and it is possible to narrow the peripheral region FR (perform frame narrowing). In this way, the embodiment of the present invention enables both drive power reduction and frame narrowing of an active matrix substrate including the DEMUX circuit.

Figure 3:
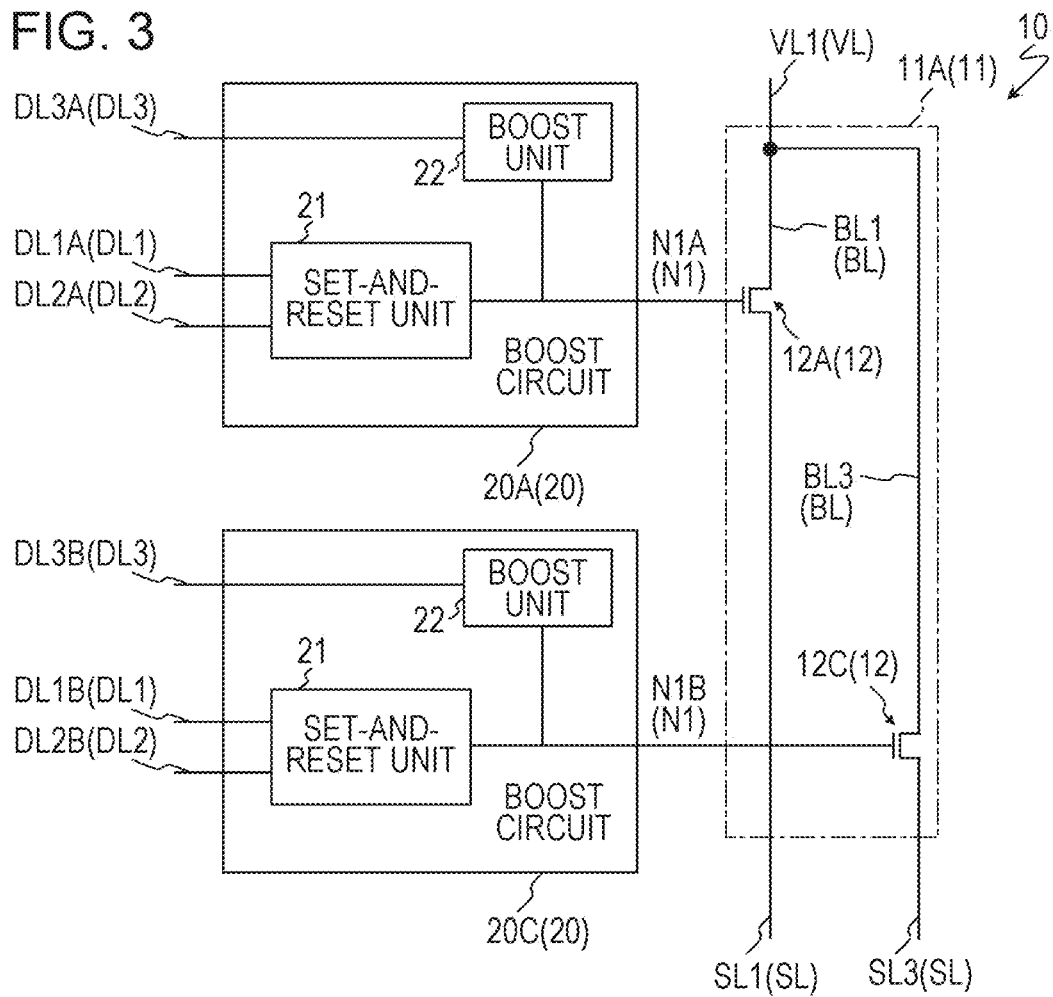
FIG. 3 is a view illustrating an example of a configuration of a boost circuit 20 included in the DEMUX circuit 10.

Subsequently, with reference to FIG. 3, a specific configuration of the boost circuit 20 will be described. FIG. 3 is a view illustrating an example of a configuration of the boost circuit 20.

In the example shown in FIG. 3, each boost circuit 20 includes a set-and-reset unit 21 and a boost unit 22. The set-and-reset unit 21 and the boost unit 22 are connected to a node N1 connected to the gate electrode of the switching TFT 12. Moreover, the set-and-reset unit 21 is connected to the first drive signal line DL1 and the second drive signal line DL2, and the boost unit 22 is connected to the third drive signal line DL3.

The set-and-reset unit 21 is supplied with the first drive signal (set signal) via the first drive signal line DL1 to perform an operation of pre-charging (hereinafter referred to as "set operation") of the node N1. The first drive signal is a signal whose level changes at the start of at least the set operation. Moreover, the set-and-reset unit 21 is supplied with the second drive signal (reset signal) via the second drive signal line DL2 to perform an operation of resetting (hereinafter referred to as a "reset operation") of the node N1. The second drive signal is a signal having a level which does not change at the start of the set operation and which is different from the level of the first drive signal at the time of performing the reset operation. The set operation and the reset operation by the set-and-reset unit 21 are performed at different timings.

The boost unit 22 is supplied with the third drive signal (boost signal) via the third drive signal line DL3 to boost the potential of the node N1 pre-charged by the set operation performed by the set-and-reset unit 21. The third drive signal is a signal whose level changes at the start of at least boost operation.

Figure 4:
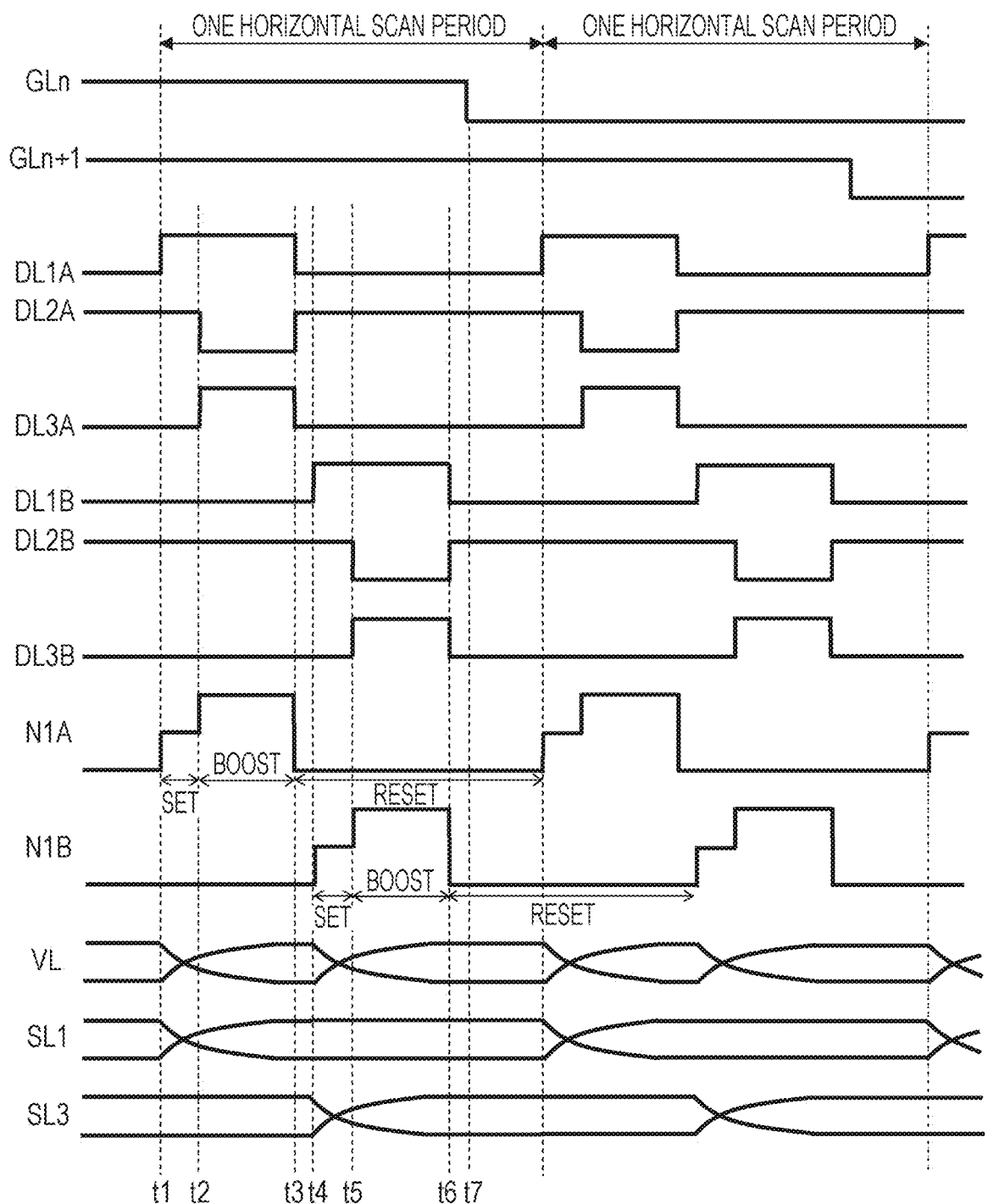
FIG. 4 is a timing diagram illustrating operation of the DEMUX circuit 10.

With reference to also FIG. 4, operation (of the DEMUX circuit 10) of the boost circuit 20 will now be described. FIG. 4 is a timing diagram illustrating the operation of the DEMUX circuit 10. FIG. 4 shows potentials of the first drive signal lines DL1A and DL1B, the second drive signal lines DL2A and DL2B, the third drive signal lines DL3A and DL3B, nodes N1A and N1B, the signal output line VL, and the source bus lines SL1 and SL3. FIG. 4 also shows potentials of gate bus lines GLn and GLn+1.

First, at time t1, the potential of the first drive signal line DL1A transitions to a high level. At this time, the potential of the second drive signal line DL2A remains at the high level from the previous horizontal scan period, and the first drive signal is input as the set signal to the set-and-reset unit 21 of the boost circuit 20A. Thus, the node N1A connected to the gate electrode of the switching TFT 12A is pre-charged (set operation). Moreover, at this timing, the level of the potential of the signal output line VL (i.e., display signal) changes to the write voltage level to start charging of the source bus line SL1 selected.

Then, at time t2, the potential of the second drive signal DL2A transitions to a low level, the potential of the third drive signal line DL3A transitions to the high level, and the third drive signal is input as a boost signal to the boost unit 22 of the boost circuit 20A. This boosts the potential of the node N1A (boost operation). Boosting the potential of the node N1A satisfactorily charges the source bus line SL1 via the switching TFT 12A.

Subsequently, at time t3, the potential of the first drive signal line DL1A transitions to the low level, the potential of the second drive signal line DL2A transitions to the high level, the potential of the third drive signal line DL3A transitions to the low level, and the second drive signal is input as the reset signal to the set-and-reset unit 21 of the boost circuit 20A. Thus, the potential of the node N1A is reset (reset operation), and writing to the source bus line SL1 is completed.

Then, at time t4, the potential of the first drive signal line DL1B transitions to the high level. At this time, the potential of the second drive signal line DL2B remains at the high level from the previous horizontal scan period, and the first drive signal is input as the set signal to the set-and-reset unit 21 of the boost circuit 20C. Thus, the node N1B connected to the gate electrode of the switching TFT 12C is pre-charged (set operation). Moreover, at this timing, the level of the potential of the signal output line VL (i.e., display signal) changes to the write voltage level to start charging of the source bus line SL3 selected.

Subsequently, at time t5, the potential of the second drive signal DL2B transitions to the low level, the potential of the third drive signal line DL3B transitions to the high level, and the third drive signal is input as a boost signal to the boost unit 22 of the boost circuit 20C. This boosts the potential of the node N1B (boost operation). Boosting the potential of the node N1B satisfactorily charges the source bus line SL3 via the switching TFT 12C.

Then, at time t6, the potential of the first drive signal line DL1B transitions to the low level, the potential of the second drive signal line DL2B transitions to the high level, the potential of the third drive signal line DL3B transitions to the low level, and the second drive signal is input as the reset signal to the set-and-reset unit 21 of the boost circuit 20C. Thus, the potential of the node N1B is reset (reset operation), and writing to the source bus line SL3 is completed.

Thereafter, when the writing to the source bus lines SL1 and SL3 is completed (potential is determined), the gate signal supplied via the gate bus line GLn transitions to an OFF level (time t7), and writing of a display voltage to the pixel PIX is completed. Hereafter, the above-described operations are repeated to perform writing to all the gate bus lines GL.

Figure 5:
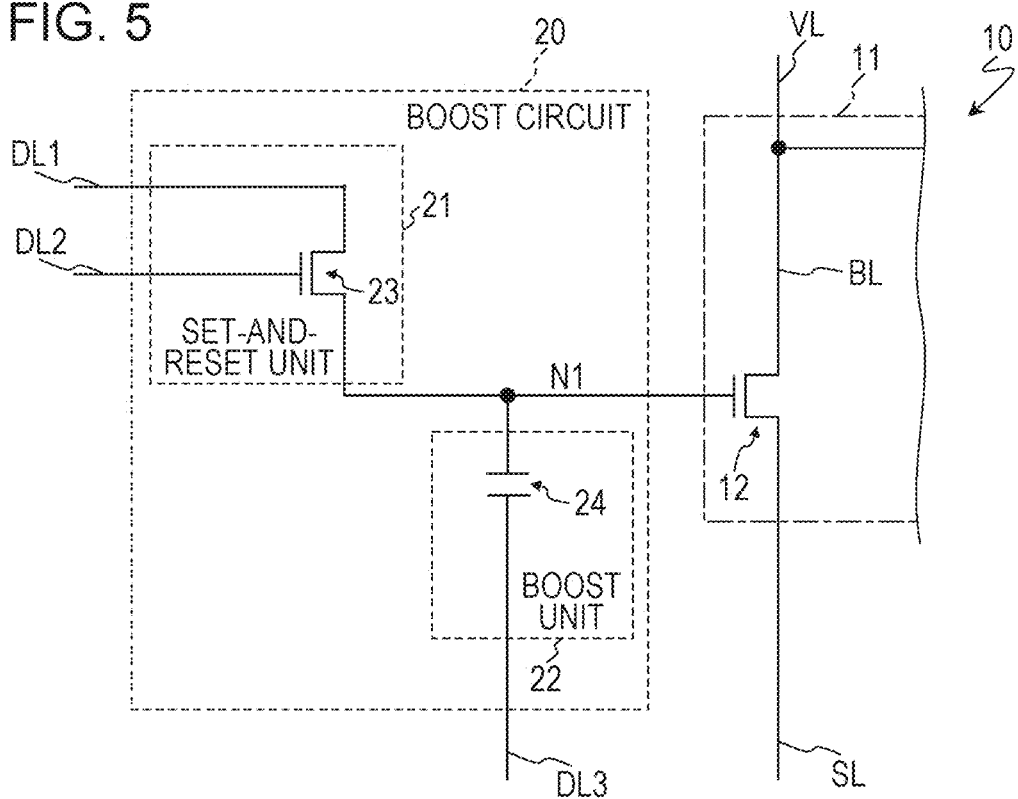
FIG. 5 is a view illustrating an example of specific configurations of a set-and-reset unit 21 and a boost unit 22 included in the boost circuit 20.

With reference to FIG. 5, a more specific configuration of the boost circuit 20 will be described. FIG. 5 is a view illustrating an example of specific configurations of the set-and-reset unit 21 and the boost unit 22 of the boost circuit 20.

In the example shown in FIG. 5, the set-and-reset unit 21 includes a TFT (hereinafter referred to as a "setting-and-resetting TFT") 23. The setting-and-resetting TFT 23 includes a gate electrode connected to the second drive signal line DL2. The setting-and-resetting TFT 23 further includes a drain electrode connected to the first drive signal line DL1, and the setting-and-resetting TFT 23 includes a source electrode connected to the node N1.

The boost unit 22 includes a capacitive element (hereinafter referred to as a "boosting capacitive element") 24. The boosting capacitive element 24 includes an electrode (first capacitance electrode) connected to the third drive signal line DL3 and an electrode (second capacitance electrode) connected to the node N1.

Figure 6:
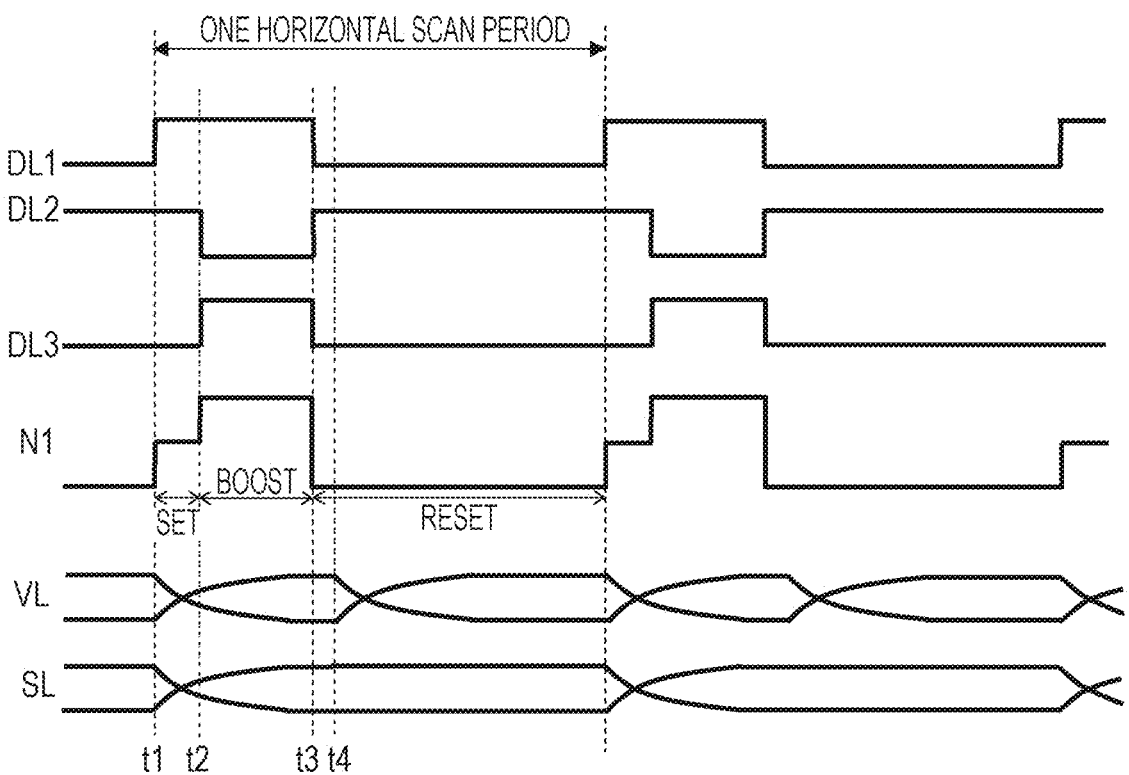
FIG. 6 is a timing diagram illustrating operation of the boost circuit 20.

With reference to FIG. 6, operation of the boost circuit 20 shown in FIG. 5 will be described. FIG. 6 is a timing diagram illustrating the operation of the boost circuit 20. FIG. 6 shows potentials of the first drive signal line DL1, the second drive signal line DL2, the third drive signal line DL3, the node N1, the signal output line VL, and the source bus line SL. In the following description, the high level and the low level of the potentials of the first drive signal line DL1, the second drive signal line DL2, and the third drive signal line DL3 are respectively referred to as "VDH" and "VDL". The VDH is, for example, 10 V, and the VDL is, for example, −10 V.

First, when the level of the potential (set signal) of the first drive signal line DL1 changes from the low level to the high level at time t1 with the potential (reset signal) of the second drive signal line DL2 remaining at the high level, the setting-and-resetting TFT 23 transitions to an ON state, and the node N1 is pre-charged. Here, the gate electrode and the drain electrode of the setting-and-resetting TFT 23 have the same potential, and the setting-and-resetting TFT 23 is in a so-called diode-connected state, and therefore, assuming that the threshold voltage of the setting TFT 23 is Vth, the node N1 is pre-charged to a (VDH−Vth) potential.

Then, when the level of the potential (boost signal) of the third drive signal line DL3 changes from the low level to the high level at time t2 (at this time, the level of the potential of the second drive signal line DL2 changes to the low level), the potential of the node N1 is boosted. The degree of boosting varies depending on a ratio of a capacitance value Cbst of the boosting capacitive element 24 to a sum (total load capacitance) Cn1 of the load capacitance of the node N1. Specifically, the potential by which boosting is performed is obtained by multiplying a boosted voltage (=VDH−VDL) by (Cbst/Cn1). Thus, for example, when the total load capacitance Cn1 of the node N1 is 0.2 pF, and the capacitance value Cbst of the boosting capacitive element 24 is 0.1 pF, the potential of the node N1 is boosted from (VDH−Vth) to {(VDH−Vth)+(VDH−VDL)×(0.1/0.2)}. When VDH=10 V, VDL=−10 V, and Vth=2 V, the potential of the node N1 is boosted to 18 V.

Then, when at time t3, the level of the potential of the first drive signal line DL1 and the level of the potential of the third drive signal line DL3 change to the low level, and the level of the potential (reset signal) of the second drive signal line DL2 changes to the high level, the potential of the node N1 is reset (pulled down).

As described above, the first drive signal, the second drive signal, and the third drive signal each have a periodic waveform including a change from the low level to the high level and a change from the high level to the low level, and when both the first drive signal and the second drive signal are at the high level, the set operation is performed. Moreover, when the third drive signal is at the high level, the boost operation is performed, and when the first drive signal is at the low level and the second drive signal is at the high level, the reset operation is performed.

Figure 7:
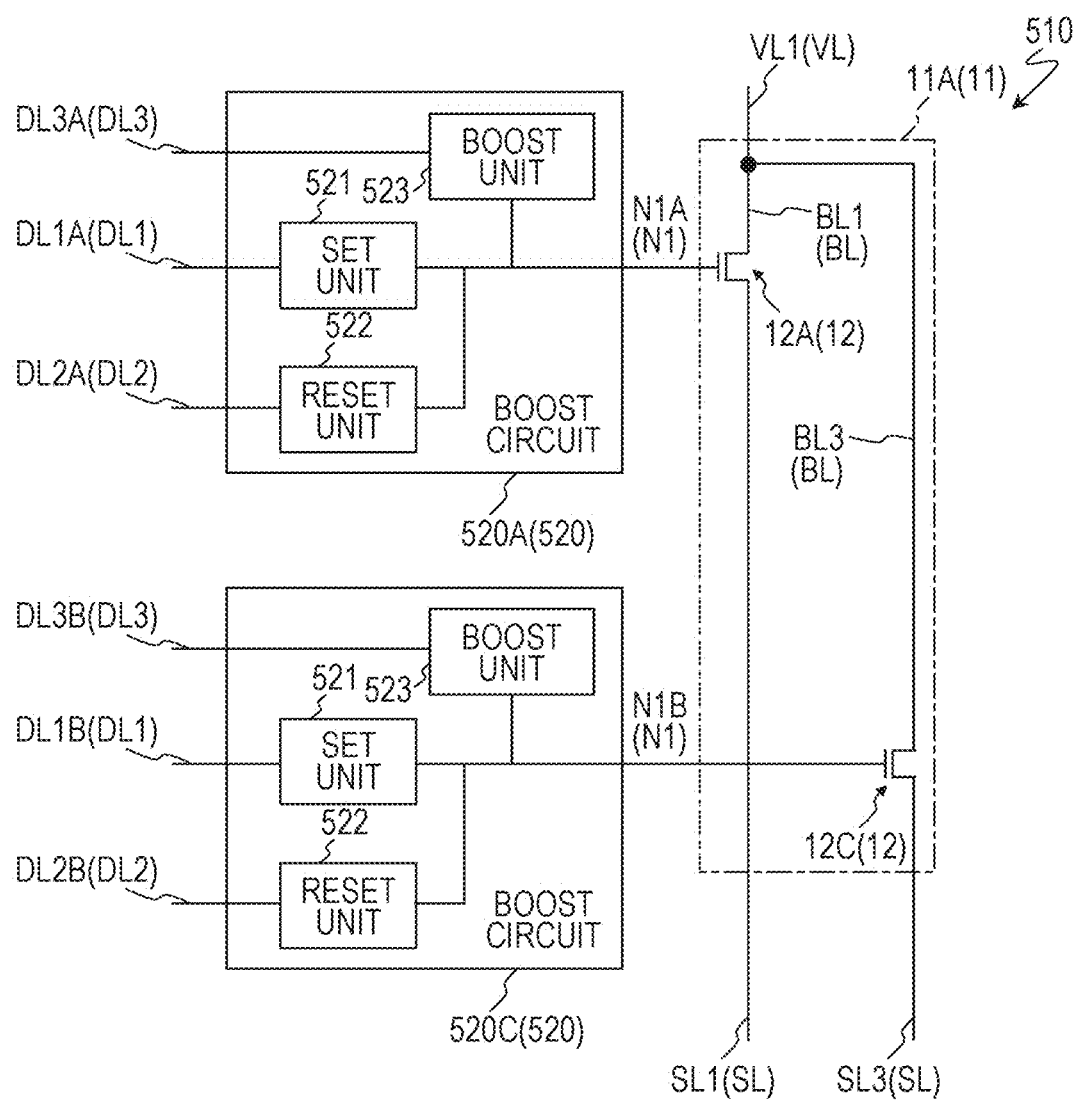
FIG. 7 is a view illustrating a boost circuit 520 included in a DEMUX circuit 510 of a comparative example.

Here, advantageous points of the DEMUX circuit 10 of the present embodiment over a DEMUX circuit of a comparative example will be described. FIG. 7 is a view illustrating boost circuits 520 included in a DEMUX circuit 510 of the comparative example.

Each boost circuit 520 shown in FIG. 7 has a configuration different from the configuration of the boost circuit 20 of the DEMUX circuit 10 of the present embodiment. The boost circuits 520 (520A and 520C) each include a set unit 521, a reset unit 522, and a boost unit 523. The set unit 521, the reset unit 522, and the boost unit 523 are connected to a node N1 connected to a gate electrode of a switching TFT 12. Moreover, the set unit 521 is connected to a first drive signal line DL1, the reset unit 522 is connected to a second drive signal line DL2, and the boost unit 523 is connected to a third drive signal line DL3.

The set unit 521 is supplied with a first drive signal (set signal) via the first drive signal line DL1 to pre-charge the node N1. The boost unit 523 is supplied with a third drive signal (boost signal) via the third drive signal line DL3 to boost the potential of the node N1 pre-charged by the set unit 521. The reset unit 522 is supplied with a second drive signal (reset signal) via the second drive signal line DL2 to reset the potential of the node N1.

Figure 8:
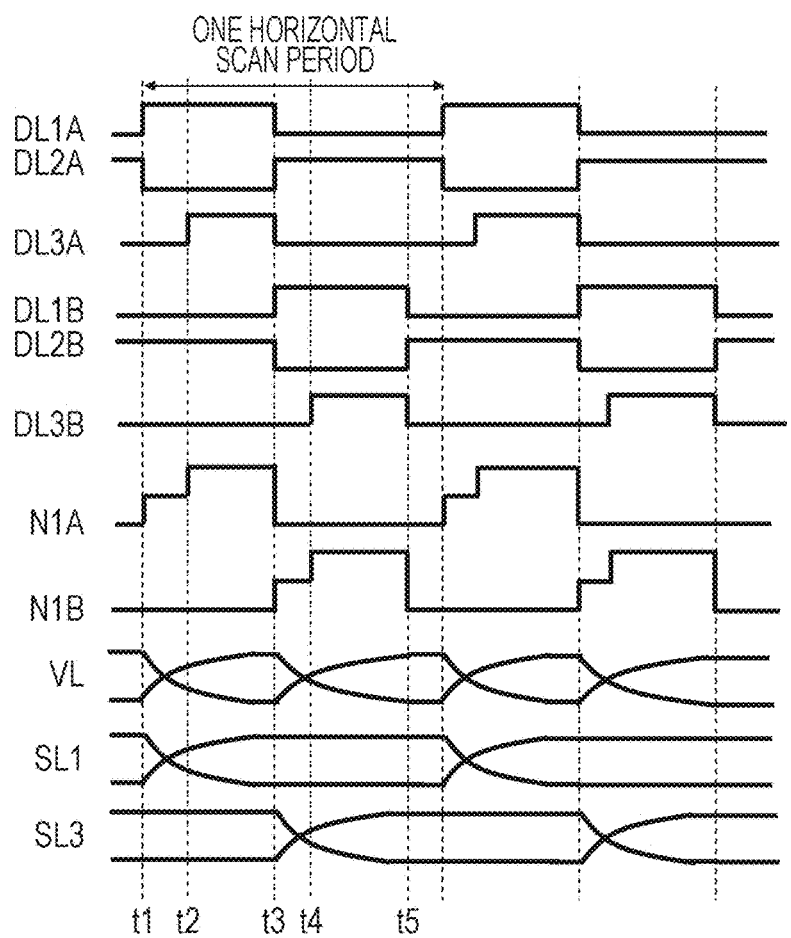
FIG. 8 is a timing diagram illustrating operation of the DEMUX circuit 510.

FIG. 8 is a timing diagram illustrating operation of the DEMUX circuit 510. FIG. 8 shows potentials of first drive signal lines DL1A and DL1B, second drive signal lines DL2A and DL2B, third drive signal lines DL3A and DL3B, nodes N1A and N1B, a signal output line VL, and source bus lines SL1 and SL3.

First, at time t1, the potential of the first drive signal line DL1A transitions to the high level, the potential of the second drive signal line DL2A transitions to the low level, and the first drive signal is input as the set signal to the set unit 521 of the boost circuit 520A. Thus, the node N1A connected to the gate electrode of the switching TFT 12A is pre-charged. Moreover, at this timing, the level of the potential of the signal output line VL (i.e., display signal) changes to the write voltage level to start charging of the source bus line SL1 selected.

Then, at time t2, the potential of the third drive signal line DL3A transitions to the high level, and the third drive signal is input as the boost signal to the boost unit 523 of the boost circuit 520A. This boosts the potential of the node N1A. Boosting the potential of the node N1A satisfactorily charges the source bus line SL1 via the switching TFT 12A.

Subsequently, at time t3, the potential of the first drive signal line DL1A transitions to the low level, the potential of the second drive signal line DL2A transitions to the high level, the potential of the third drive signal line DL3A transitions to the low level, and the second drive signal is input as the reset signal to the reset unit 522 of the boost circuit 520A. Thus, the potential of the node N1A is reset, and writing to the source bus line SL1 is completed.

Moreover, at the time t3, the potential of the first drive signal line DL1B transitions to the high level, the potential of the second drive signal line DL2B transitions to the low level, and the first drive signal is input as the set signal to the set unit 521 of the boost circuit 520C. Thus, the node N1B connected to the gate electrode of the switching TFT 12C is pre-charged. Moreover, at this timing, the level of the potential of the signal output line VL (i.e., display signal) changes to the write voltage level to start charging of the source bus line SL3 selected.

Then, at time t4, the potential of the third drive signal line DL3B transitions to the high level, and the third drive signal is input as the boost signal to the boost unit 523 of the boost circuit 520C. This boosts the potential of the node N1B. Boosting the potential of the node N1B satisfactorily charges the source bus line SL3 via the switching TFT 12C.

Then, at time t5, the potential of the first drive signal line DL1B transitions to the low level, the potential of the second drive signal line DL2B transitions to the high level, the potential of the third drive signal line DL3B transitions to the low level, and the second drive signal is input as the reset signal to the reset unit 522 of the boost circuit 520C. Thus, the potential of the node N1B is reset, and writing to the source bus line SL3 is completed.

When the writing to the source bus lines SL1 and SL3 is completed (potential is determined), the gate signal supplied via the gate bus line GL transitions to the OFF level, and writing of a display voltage to the pixel PIX is completed.

Figure 9:
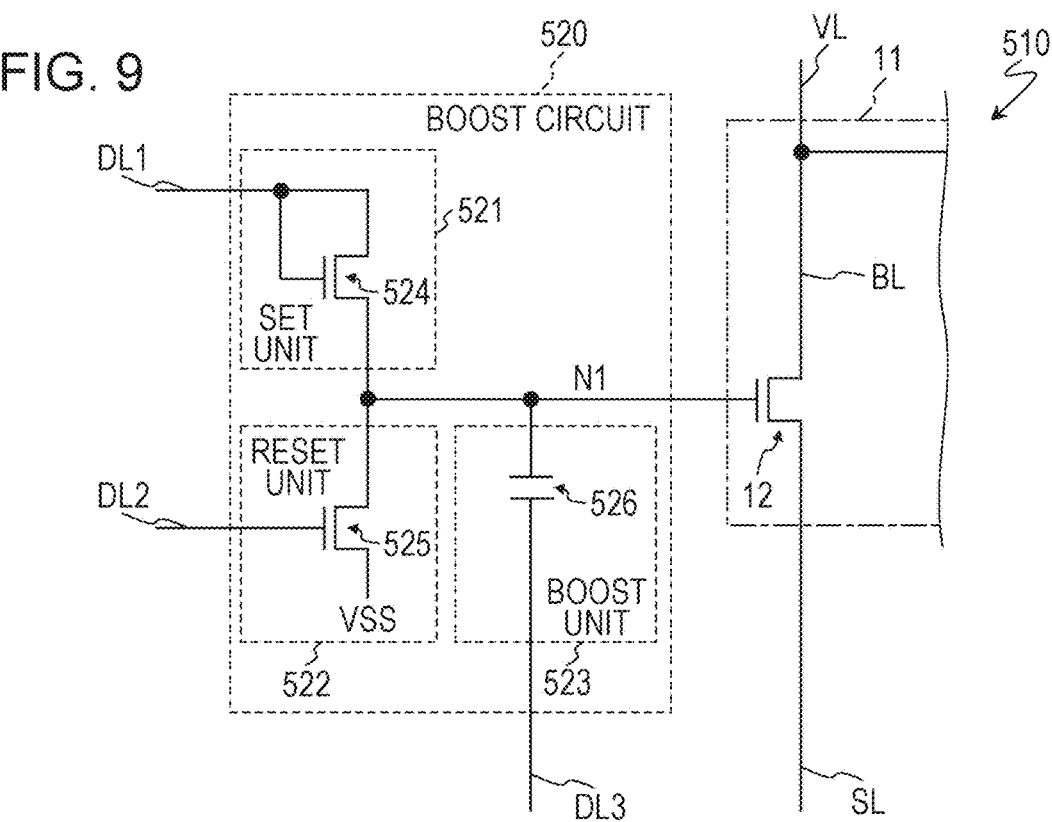
FIG. 9 is a view illustrating an example of specific configurations of a set unit 521, a reset unit 522, and a boost unit 523 included in the boost circuit 520.

FIG. 9 is a view illustrating an example of specific configurations of the set unit 521, the reset unit 522, and the boost unit 523 of the boost circuit 520.

In the example shown in FIG. 9, the set unit 521 includes a TFT (hereinafter referred to as a "setting TFT") 524. The setting TFT 524 is diode-connected, and the setting TFT 524 includes a gate electrode and a drain electrode connected to the first drive signal line DL1. Moreover, the setting TFT 524 includes a source electrode connected to the node N1.

The reset unit 522 includes a TFT (hereinafter referred to as a "resetting TFT") 525. The resetting TFT 525 includes a gate electrode connected to the second node DL2. The resetting TFT 525 is configured to pull down the potential of the node N1. Specifically, the resetting TFT 525 includes a source electrode to which a constant potential (negative power supply potential VSS) is given, and the resetting TFT 525 includes a drain electrode connected to the node N1.

The boost unit 523 includes a capacitive element (hereinafter referred to as a "boosting capacitive element") 526. The boosting capacitive element 526 includes an electrode (first capacitance electrode) connected to the third drive signal line DL3 and an electrode (second capacitance electrode) connected to the node N1.

As described above, in the DEMUX circuit 510 of the comparative example, each boost circuit 520 includes the set unit 521, the reset unit 522, and the boost unit 523. In contrast, in the DEMUX circuit 10 of the present embodiment, the boost circuit 10 includes the set-and-reset unit 21 and the boost unit 23. Thus, the present embodiment enables the number of elements of the boost circuit 20 to be reduced. For example, in the configuration exemplarily shown in FIG. 9, the boost circuit 520 includes two TFTs (setting TFT 524 and resetting TFT 525) and one capacitive element (boosting capacitive element 526), whereas in the configuration exemplarily shown in FIG. 5, the boost circuit 20 includes one TFT (setting-and-resetting TFT 23) and one capacitive element (boosting capacitive element 24). Thus, according to the present embodiment, further frame narrowing is possible.

Note that specific configurations of the set-and-reset unit 21 and the boost unit 22 included in the boost circuit 20 are not limited to the example shown in FIG. 5. For example, the set-and-reset unit 21 may include a plurality of setting-and-resetting TFTs 23. Note that in terms of reducing the number of elements, the set-and-reset unit 21 preferably includes only one setting-and-resetting TFT 23.

[Modification Example of Operation of Boost Circuit]

Figure 10:
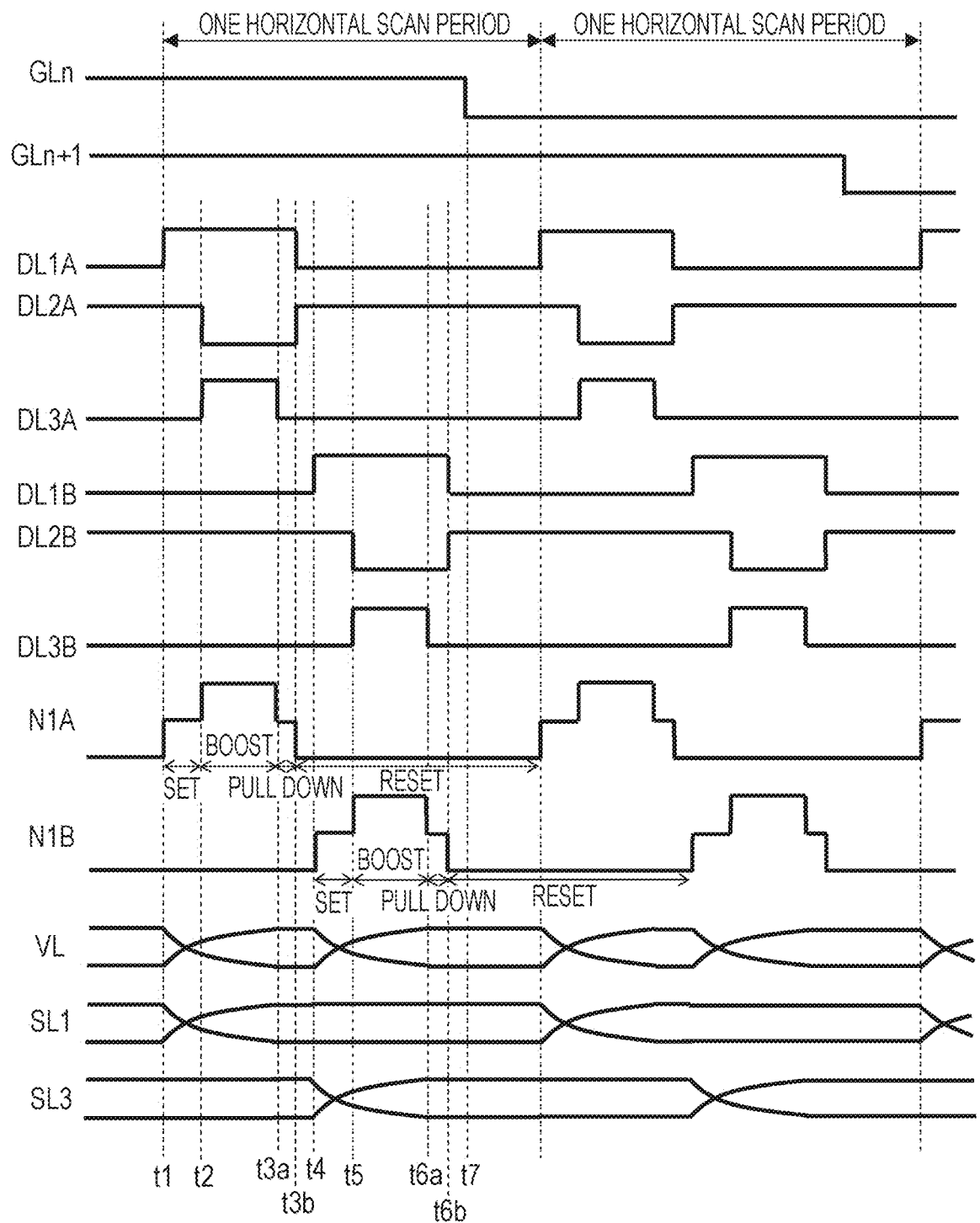
FIG. 10 is a timing diagram illustrating a modification example of the operation of the DEMUX circuit 10.

With reference to FIG. 10, a modification example of the operation (of the DEMUX circuit 10) of the boost circuit 20 will be described. FIG. 10 is a timing diagram illustrating the modification example of the operation of the DEMUX circuit 10.

In the embodiment shown in FIG. 10, the boost circuit 20 performs, prior to the reset operation, pull-down operation of pulling down the potential of the node N1 boosted by the boost operation to a potential achieved when the node N1 is pre-charged by the set operation. That is, the potential of the node N1 is pulled down in two steps (pulling down by the pull-down operation and pulling down by the reset operation). Specific description will be given below.

First, at time t1, the potential of the first drive signal line DL1A transitions to the high level. At this time, the potential of the second drive signal line DL2A remains at the high level from the previous horizontal scan period, and the first drive signal is input as the set signal to the set-and-reset unit 21 of the boost circuit 20A. Thus, the node N1A connected to the gate electrode of the switching TFT 12A is pre-charged (set operation). Moreover, at this timing, the level of the potential of the signal output line VL (i.e., display signal) changes to the write voltage level to start charging of the source bus line SL1 selected.

Then, at time t2, the potential of the second drive signal DL2A transitions to the low level, the potential of the third drive signal line DL3A transitions to the high level, and a third drive signal is input as the boost signal to the boost unit 23 of the boost circuit 20A. This boosts the potential of the node N1A (boost operation). Boosting the potential of the node N1A satisfactorily charges the source bus line SL1 via the switching TFT 12A.

Subsequently, at time t3a, the potential of the third drive signal line DL3A transitions to the low level, and thereby, the potential of the node N1A is pulled down to the potential achieved when the node N1A is pre-charged by the set operation (pull-down operation).

Next, at time tab, the potential of the first drive signal line DL1A transitions to the low level, the potential of the second drive signal line DL2A transitions to the high level, and the second drive signal is input as the reset signal to the set-and-reset unit 21 of the boost circuit 20A. Thus, the potential of the node N1A is further pulled down and reset (reset operation), and writing to the source bus line SL1 is completed.

Subsequently, at time t4, the potential of the first drive signal line DL1B transitions to the high level. At this time, the potential of the second drive signal line DL2B remains at the high level from the previous horizontal scan period, and the first drive signal is input as the set signal to the set-and-reset unit 21 of the boost circuit 20C. Thus, the node N1B connected to the gate electrode of the switching TFT 12C is pre-charged (set operation). Moreover, at this timing, the level of the potential of the signal output line VL (i.e., display signal) changes to the write voltage level to start charging of the source bus line SL3 selected.

Then, at time t5, the potential of the second drive signal DL2B transitions to the low level, the potential of the third drive signal line DL3B transitions to the high level, and the third drive signal is input as the boost signal to the boost unit 22 of the boost circuit 20C. This boosts the potential of the node N1B (boost operation). Boosting the potential of the node N1B satisfactorily charges the source bus line SL3 via the switching TFT 12C.

Subsequently, at time t6a, the potential of the third drive signal line DL3B transitions to the low level, and thereby, the potential of the node N1B is pulled down to the potential achieved when the node N1B is pre-charged by the set operation (pull-down operation).

Next, at time t6b, the potential of the first drive signal line DL1B transitions to the low level, the potential of the second drive signal line DL2B transitions to the high level, and the second drive signal is input as the reset signal to the set-and-reset unit 21 of the boost circuit 20C. Thus, the potential of the node N1B is further pulled down and reset (reset operation), and writing to the source bus line SL3 is completed.

Thereafter, when the writing to the source bus lines SL1 and SL3 is completed (potential is determined), the gate signal supplied via the gate bus line GLn transitions to the OFF level (time t7), and writing of a display voltage to the pixel PIX is completed. Hereafter, the above-described operations are repeated to perform writing to all the gate bus lines GL.

As in the example shown in FIG. 10, when the potential of the node N1 is pulled down in two steps, a feed-through voltage of the source bus line SL caused due to the pulling down of the potential of the node N1 is reduced. Moreover, variations of the potential of the source bus line SL due to feed-through are also reduced.

Second Embodiment

Figure 11:
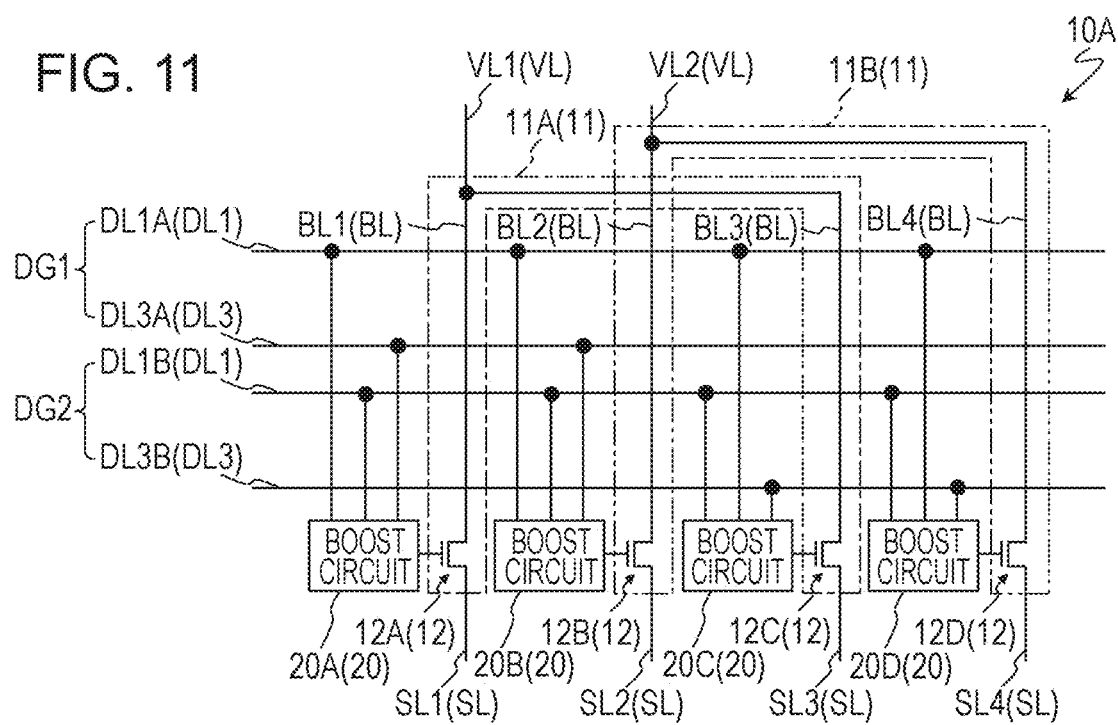
FIG. 11 is a view illustrating a configuration of a DEMUX circuit 10A included in an active matrix substrate of a second embodiment.
Figure 12:
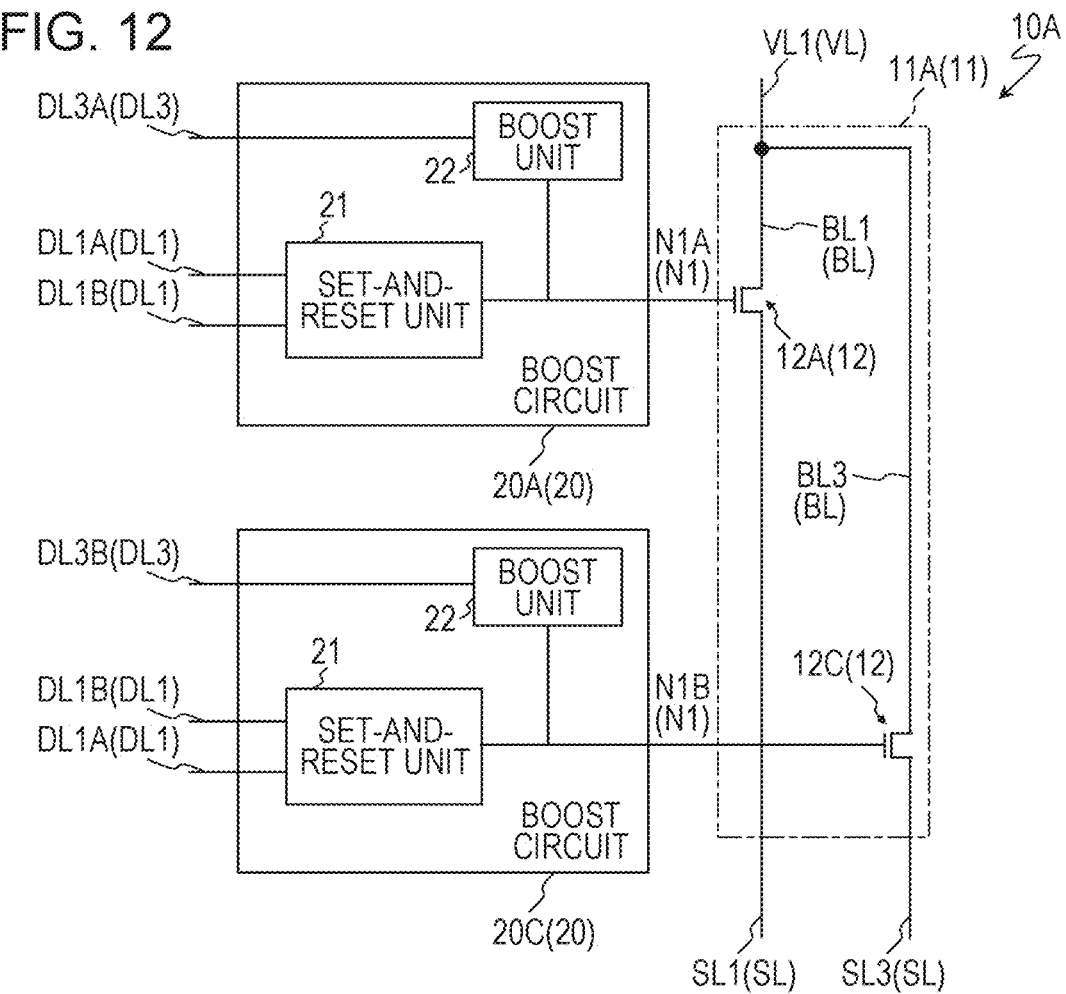
FIG. 12 is a view illustrating an example of a configuration of a boost circuit 20 included in the DEMUX circuit 10A.

With reference to FIGS. 11 and 12, an active matrix substrate of the present embodiment will be described. FIGS. 11 and 12 are views each illustrating a configuration of a DEMUX circuit 10A included in the active matrix substrate of the present embodiment.

As illustrated in FIG. 11, the DEMUX circuit 10A of the present embodiment is different from the DEMUX circuit 10 shown in FIGS. 2 and 3 in that the DEMUX circuit 10A does not include the second drive signal line DL2. FIG. 12 shows boost circuits (first boost circuit and second boost circuit) 20A and 20C respectively connected to two switching TFTs (first switching TFT and second switching TFT) 12A and 12C included in a unit circuit 11A of the DEMUX circuit 10A. The first switching TFT 12A and the second switching TFT 12C are brought into an ON state at different timings in one horizontal scan period.

As illustrated in FIG. 12, a first drive signal line DL1B for the second boost circuit 20C, instead of the second drive signal line DL2, is connected to a set-and-reset unit 21 of the first boost circuit 20A. Moreover, a first drive signal line DL1A for the first boost circuit 20A, instead of the second drive signal line DL2, is connected to a set-and-reset unit 21 of the second boost circuit 20C.

As described above, in the present embodiment, the first drive signal line DL1A for the first boost circuit 20A serves also as a second drive signal line for the second boost circuit 20C, and the first drive signal line DL1B for the second boost circuit 20C serves also as a second drive signal line for the first boost circuit 20A. Adopting the configuration of the present embodiment enables the second drive signal line to be omitted, thereby further reducing the number of lines.

Figure 13:
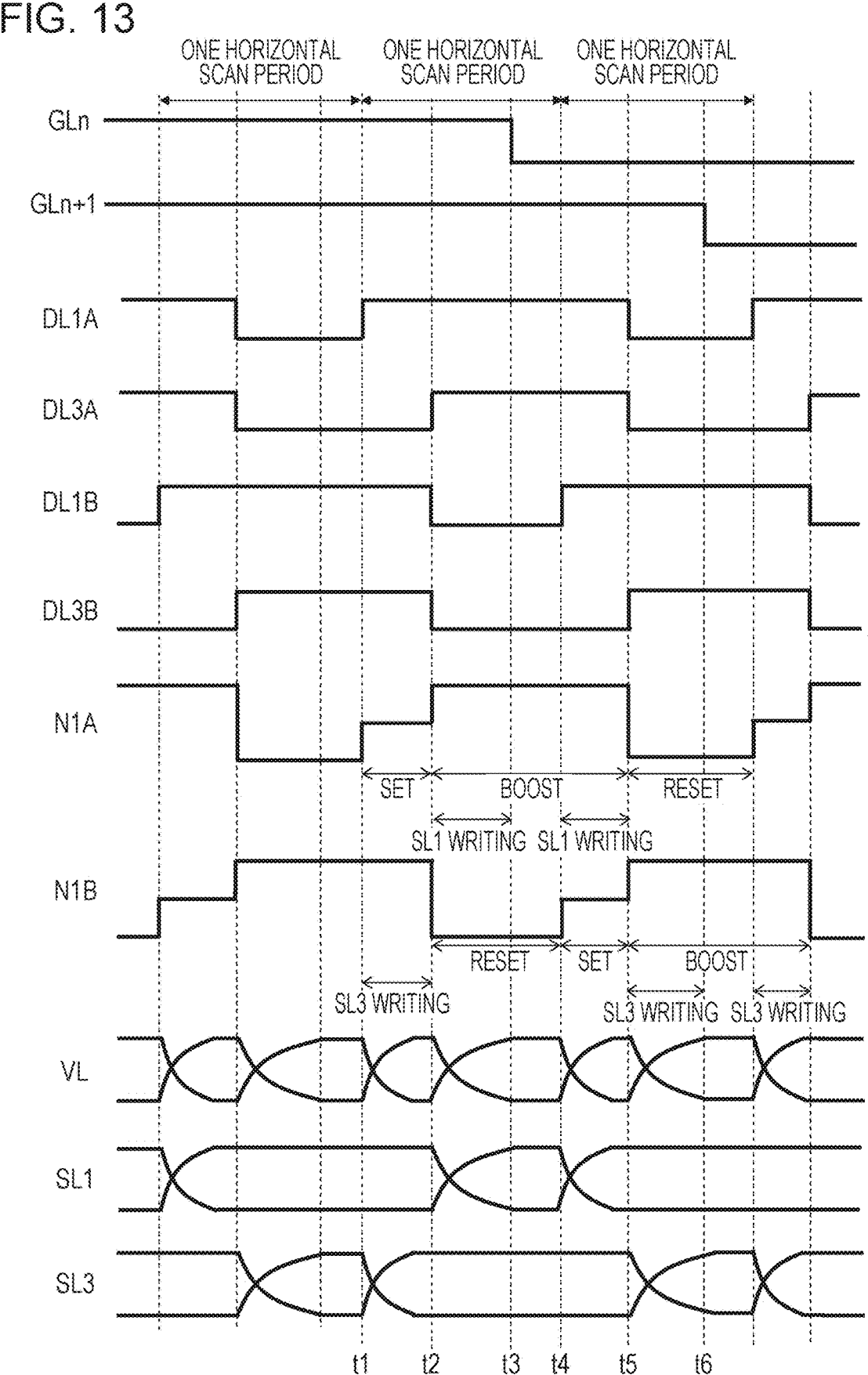
FIG. 13 is a timing diagram illustrating operation of the DEMUX circuit 10A.

With reference to also FIG. 13, operation of the DEMUX circuit 10A will now be described. FIG. 13 is a timing diagram illustrating the operation of the DEMUX circuit 10A.

[Time t1]
First switching TFT 12A side: The potential of the first drive signal line DL1A for the first boost circuit 20A transitions to a high level. At this time, the potential of the first drive signal line DL1B for the second boost circuit 20C remains at the high level from the previous horizontal scan period, and the first drive signal for the first boost circuit 20A is input as a set signal to the set-and-reset unit 21 of the boost circuit 20A. Thus, a node N1A connected to a gate electrode of the first switching TFT 12A is pre-charged (set operation).

Second switching TFT 12C side: A node N1B connected to a gate electrode of the second switching TFT 12C has a voltage boosted in the previous horizontal scan period, and therefore, a source bus line SL3 is charged to a write voltage level of a signal output line VL.

[Time t2]
First switching TFT 12A side: The potential of a third drive signal line DL3A transitions to the high level, and a third drive signal is input as a boost signal to a boost unit 22 of the boost circuit 20A. This boosts the potential of the node N1A (boost operation). Boosting the potential of the node N1A satisfactorily charges a source bus line SL1 via the switching TFT 12A.

Second switching TFT 12C side: The potential of the first drive signal line DL1B and the potential of a third drive signal line DL3B transition to a low level, and the first drive signal for the first boost circuit 20A is input as a reset signal to the set-and-reset unit 21 of the second boost circuit 20C. Thus, the potential of the node N1B is reset (reset operation).

[Time t3]
In a state where the source bus lines SL1 and SL3 are each charged with a write voltage, a gate signal supplied via a gate bus line GLn transitions to an OFF level, and writing of a display voltage is completed.

[Time t4]
First switching TFT 12A side: The node N1A connected to the gate electrode of the first switching TFT 12A has a voltage boosted in the previous horizontal scan period, and therefore, the source bus line SL1 is charged to the write voltage level of the signal output line VL.

Second switching TFT 12C side: The potential of the first drive signal line DL1B for the second boost circuit 20A transitions to the high level. At this time, the potential of the first drive signal line DL1A for the first boost circuit 20A remains at the high level from the previous horizontal scan period, and the first drive signal for the second boost circuit 20C is input as the set signal to the set-and-reset unit 21 of the boost circuit 20C. Thus, the node N1B connected to the gate electrode of the second switching TFT 12C is pre-charged (set operation).

[Time t5]
First switching TFT 12A side: The potential of the first drive signal line DL1A and the potential of the third drive signal line DL3A transition to the low level, and the first drive signal for the second boost circuit 20C is input as the reset signal to the set-and-reset unit 21 of the first boost circuit 20A. Thus, the potential of the node N1A is reset (reset operation).

Second switching TFT 12C side: The potential of the third drive signal line DL3B transitions to the high level, and the third drive signal is input as the boost signal to a boost unit 22 of the boost circuit 20C. This boosts the potential of the node N1B (boost operation). Boosting the potential of the node N1B satisfactorily charges the source bus line SL1 via the switching TFT 12C.

[Time t6]

In a state where the source bus lines SL1 and SL3 are each charged with a write voltage, a gate signal supplied via a gate bus line GLn+1 transitions to the OFF level, and writing of a display voltage is completed. Hereafter, the above-described operations are repeated to perform writing to all the gate bus lines GL.

In the example shown in FIG. 13, within a period during which the boost operation is performed by the boost unit 22 of the first boost circuit 20A, the set operation is performed by the set-and-reset unit 21 of the second boost circuit 20C. Moreover, within a time period during which the boost operation is performed by the boost unit 22 of the second boost circuit 20C, the set operation is performed by the set-and-reset unit 21 of the first boost circuit 20A. Thus, it is possible to increase a pre-charge time of the node N1 and a charging time of the source bus line SL and to improve charging characteristics.

Moreover, in the example shown in FIG. 4, one period of the periodic waveform of each of the first drive signal, the second drive signal, and the third drive signal is a time corresponding to one horizontal scan period. That is, within the time corresponding to one horizontal scan period, a change from the low level to the high level occurs once and a change from the high level to the low level occurs once.

In contrast, in the example shown in FIG. 13, one period of the periodic waveform of each of the first drive signal, the second drive signal, and the third drive signal is a time corresponding to two horizontal scan periods. That is, within the time corresponding to the two horizontal scan periods, a change from the low level to the high level occurs once and a change from the high level to the low level occurs once. As described above, the frequency of the drive signal in the example shown in FIG. 13 is lower than that in the example shown in FIG. 4, and therefore, it is possible to reduce power consumption in the example shown in FIG. 13.

Note that in the example shown in FIG. 4, the source bus lines SL1 and SL3 are selected alternately, that is, in the order of source bus lines SL1, SL3, SL1, SL3 . . . . In contrast, in the example shown in FIG. 13, one of the source bus lines SL1 and SL3 is selected successively twice and then the other of the source bus lines SL1 and SL3 is selected successively twice. That is, the source bus lines are selected in the order of source bus lines SL1, SL1, SL3, SL3, SL1, SL1 . . . .

Figure 14:
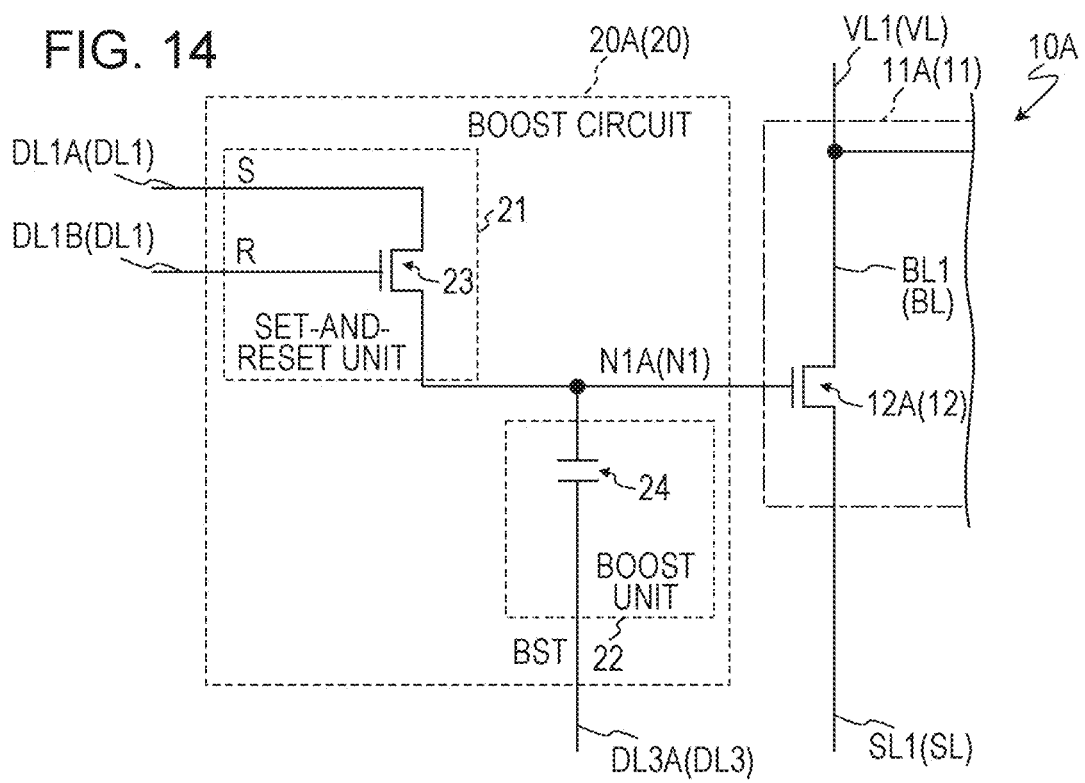
FIG. 14 is a view illustrating an example of specific configurations of a set-and-reset unit 21 and a boost unit 22 included in the boost circuit 20 of the DEMUX circuit 10A.

With reference to FIG. 14, a more specific configuration of the boost circuit 20 in the present embodiment will be described. FIG. 14 is a view illustrating an example of specific configurations of the set-and-reset unit 21 and the boost unit 22 of the first boost circuit 20A.

In the example shown in FIG. 14, the set-and-reset unit 21 includes a TFT (hereinafter referred to as a "setting-and-resetting TFT") 23. The setting-and-resetting TFT 23 includes a gate electrode which is connected to the first drive signal line DL1B for the second boost circuit 20C and which is supplied with a reset signal R via the first drive signal line DL1B. The setting-and-resetting TFT 23 includes a drain electrode which is connected to the first drive signal line DL1A and which is supplied with a set signal S via the first drive signal line DL1A. The setting-and-resetting TFT 23 includes a source electrode connected to the node N1A.

The boost unit 22 includes a capacitive element (hereinafter referred to as a "boosting capacitive element") 24. The boosting capacitive element 24 includes an electrode (first capacitance electrode) connected to the third drive signal line DL3A and an electrode (second capacitance electrode) connected to the node N1A. The first capacitance electrode is supplied with a boost signal BST via the third drive signal line DL3A.

Figure 15:
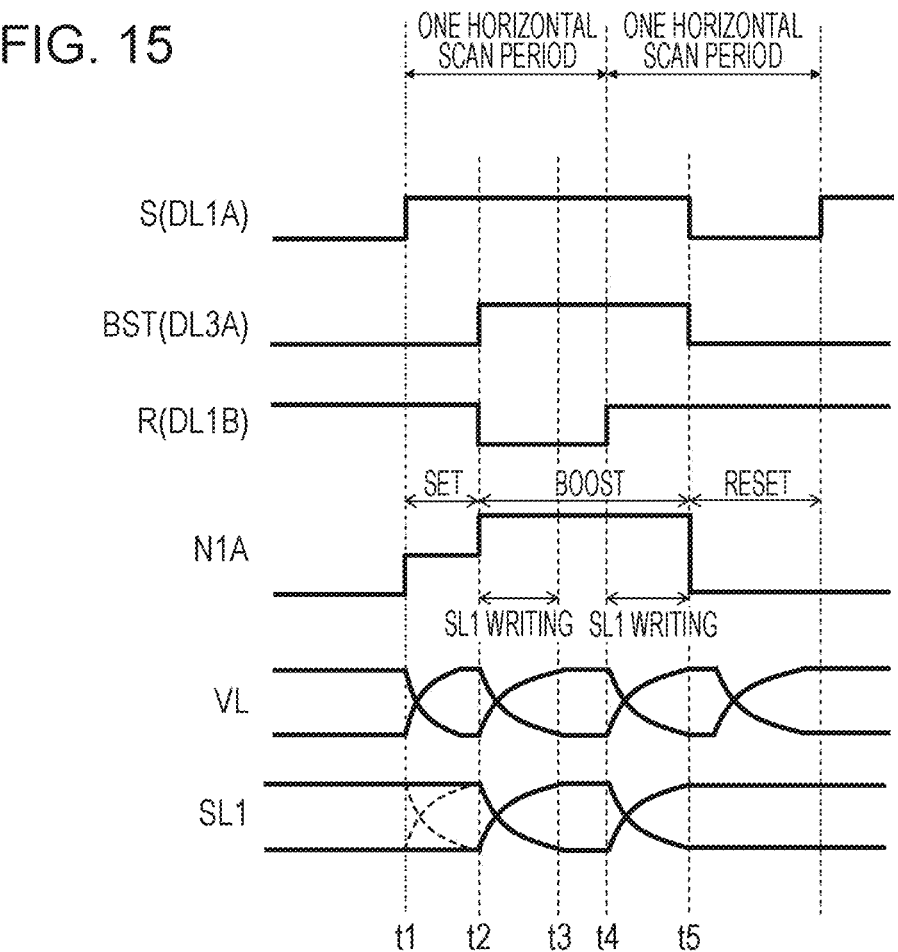
FIG. 15 is a timing diagram illustrating operation of the boost circuit 20 of the DEMUX circuit 10A.

With reference to FIG. 15, operation of the boost circuit 20 shown in FIG. 14 will be described. FIG. 15 is a timing diagram illustrating the operation of the boost circuit 20 of the DEMUX circuit 10A. In the following description, the high level and the low level of the potentials of the set signal S, the reset signal R, and the boost signal BST are respectively referred to as "VDH" and "VDL". The VDH is, for example, 10 V, and the VDL is, for example, −10 V.

First, when the level of the set signal S changes from the low level to the high level at time t1 with the reset signal R remaining at the high level, the setting-and-resetting TFT 23 transitions to the ON state, and the node N1A is pre-charged. Here, the gate electrode and the drain electrode of the setting-and-resetting TFT 23 have the same potential, and the setting-and-resetting TFT 23 is in a so-called diode-connected state, and therefore, assuming that the threshold voltage of the setting TFT 23 is Vth, the node N1 is pre-charged to a (VDH−Vth) potential.

Then, when the boost signal BST changes from the low level to the high level at time t2 (at this time, the level of the reset signal R changes to the low level), the potential of the node N1A is boosted, and charging of the source bus line SL1 (writing of the display voltage) is performed. The degree of boosting varies depending on a ratio of a capacitance value Cbst of the boosting capacitive element 24 to a sum (total load capacitance) Cn1 of the load capacitance of the node N1A. Specifically, the potential by which boosting is performed is obtained by multiplying a boosted voltage (=VDH−VDL) by (Cbst/Cn1). Thus, for example, when the total load capacitance Cn1 of the node N1 is 0.2 pF, and the capacitance value Cbst of the boosting capacitive element 24 is 0.1 pF, the potential of the node N1A is boosted from (VDH−Vth) to {(VDH−Vth)+(VDH−VDL)×(0.1/0.2)}. When VDH=10 V, VDL=−10 V, and Vth=2 V, the potential of the node N1A is boosted to 18 V.

Subsequently, at time t3, in a state where the potential of the node N1A is boosted, a gate signal supplied via a gate bus line GL transitions to the OFF level, and the writing is completed.

Next, at time t4, the node N1A has a voltage boosted in the previous horizontal scan period, and therefore, the source bus line SL1 is charged again.

Thereafter, at time t5, when each of the set signal S and the boost signal BST changes to the low level with the reset signal R remaining at the high level, the potential of the node N1A is reset (pulled down).

[Modification Example of Operation of Boost Circuit]

Figure 16:
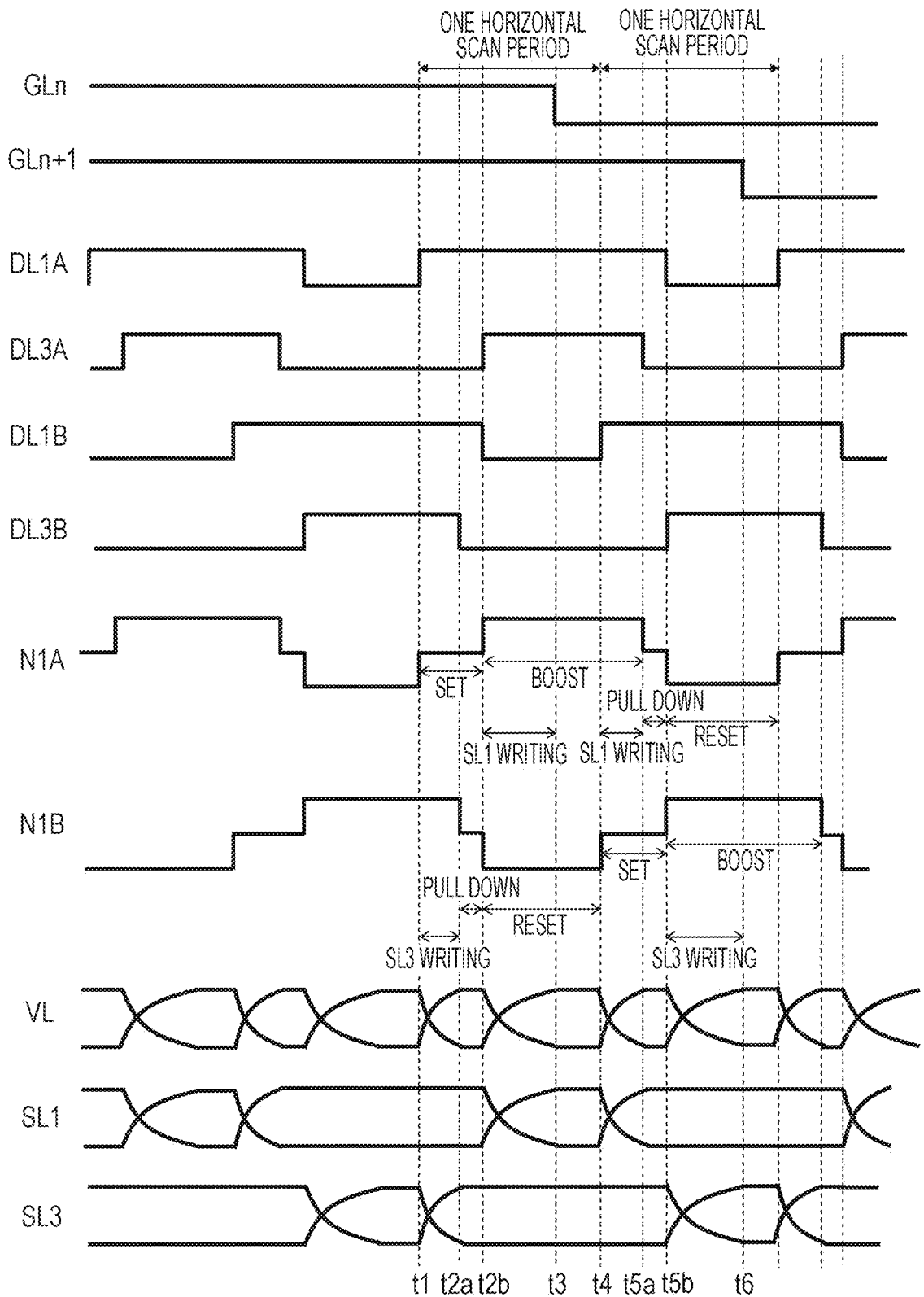
FIG. 16 is a timing diagram illustrating a modification example of the operation of the DEMUX circuit 10A.

With reference to FIG. 16, a modification example of the operation (of the DEMUX circuit 10A) of the boost circuit 20 will be described. FIG. 16 is a timing diagram illustrating the modification example of the operation of the DEMUX circuit 10A.

In the embodiment shown in FIG. 16, the boost circuit 20 performs, prior to the reset operation, pull-down operation of pulling down the potential of the node N1 boosted by the boost operation to a potential achieved when the node N1 is pre-charged by the set operation. That is, the potential of the node N1 is pulled down in two steps (pulling down by the pull-down operation and pulling down by the reset operation). Specific description will be given below.

[Time t1]

First switching TFT 12A side: The potential of the first drive signal line DL1A for the first boost circuit 20A transitions to the high level. At this time, the potential of the first drive signal line DL1B for the second boost circuit 20C remains at the high level from the previous horizontal scan period, and the first drive signal for the first boost circuit 20A is input as the set signal to the set-and-reset unit 21 of the first boost circuit 20A. Thus, the node N1A connected to the gate electrode of the first switching TFT 12A is pre-charged (set operation).

Second switching TFT 12C side: The node N1B connected to the gate electrode of the second switching TFT 12C has a voltage boosted in the previous horizontal scan period, and therefore, the source bus line SL3 is charged to the write voltage level of the signal output line VL.

[Time t2a]

Second switching TFT 12C side: The potential of the third drive signal line DL3B transitions to the low level, and thereby, the potential of the node N1B is pulled down to the potential achieved when the node N1B is pre-charged by the set operation (pull-down operation).

[Time t2b]

First switching TFT 12A side: The potential of the third drive signal line DL3A transitions to the high level, and a third drive signal is input as the boost signal to the boost unit 22 of the boost circuit 20A. This boosts the potential of the node N1A (boost operation). Boosting the potential of the node N1A satisfactorily charges the source bus line SL1 via the switching TFT 12A.

Second switching TFT 12C side: The potential of the first drive signal line DL1B transitions to the low level, and the first drive signal for the first boost circuit 20A is input as the reset signal to the set-and-reset unit 21 of the second boost circuit 20C. Thus, the potential of the node N1B is reset (reset operation).

[Time t3]

In a state where the source bus lines SL1 and SL3 are each charged with a write voltage, a gate signal supplied via the gate bus line GLn transitions to the OFF level, and writing of a display voltage is completed.

[Time t4]

First switching TFT 12A side: The node N1A connected to the gate electrode of the first switching TFT 12A has a voltage boosted in the previous horizontal scan period, and therefore, the source bus line SL1 is charged to the write voltage level of the signal output line VL.

Second switching TFT 12C side: The potential of the first drive signal line DL1B for the second boost circuit 20C transitions to the high level. At this time, the potential of the first drive signal line DL1A for the first boost circuit 20A remains at the high level from the previous horizontal scan period, and the first drive signal for the second boost circuit 20C is input as the set signal to the set-and-reset unit 21 of the second boost circuit 20C. Thus, the node N1B connected to the gate electrode of the second switching TFT 12C is pre-charged (set operation).

[Time t5a]

First switching TFT 12A side: The potential of the third drive signal line DL3A transitions to the low level, and thereby, the potential of the node N1A is pulled down to the potential achieved when the node N1A is pre-charged by the set operation (pull-down operation).

[Time t5b]

First switching TFT 12A side: The potential of the first drive signal line DL1A transitions to the low level, and the first drive signal for the second boost circuit 20C is input as the reset signal to the set-and-reset unit 21 of the first boost circuit 20A. Thus, the potential of the node N1A is reset (reset operation).

Second switching TFT 12C side: The potential of the third drive signal line DL3B transitions to the high level, and the third drive signal is input as the boost signal to the boost unit 22 of the second boost circuit 20C. This boosts the potential of the node N1B (boost operation). Boosting the potential of the node N1B satisfactorily charges the source bus line SL3 via the switching TFT 12C.

[Time t6]

In a state where the source bus lines SL1 and SL3 are each charged with a write voltage, a gate signal supplied via the gate bus line GLn+1 transitions to the OFF level, and writing of a display voltage is completed. Hereafter, the above-described operations are repeated to perform writing to all the gate bus lines GL.

As in the example shown in FIG. 16, when the potential of the node N1 is pulled down in two steps, a feed-through voltage of the source bus line SL caused due to the pulling down of the potential of the node N1 is reduced. Moreover, variations of the potential of the source bus line SL due to feed-through are also reduced.

Third Embodiment

Figure 17:
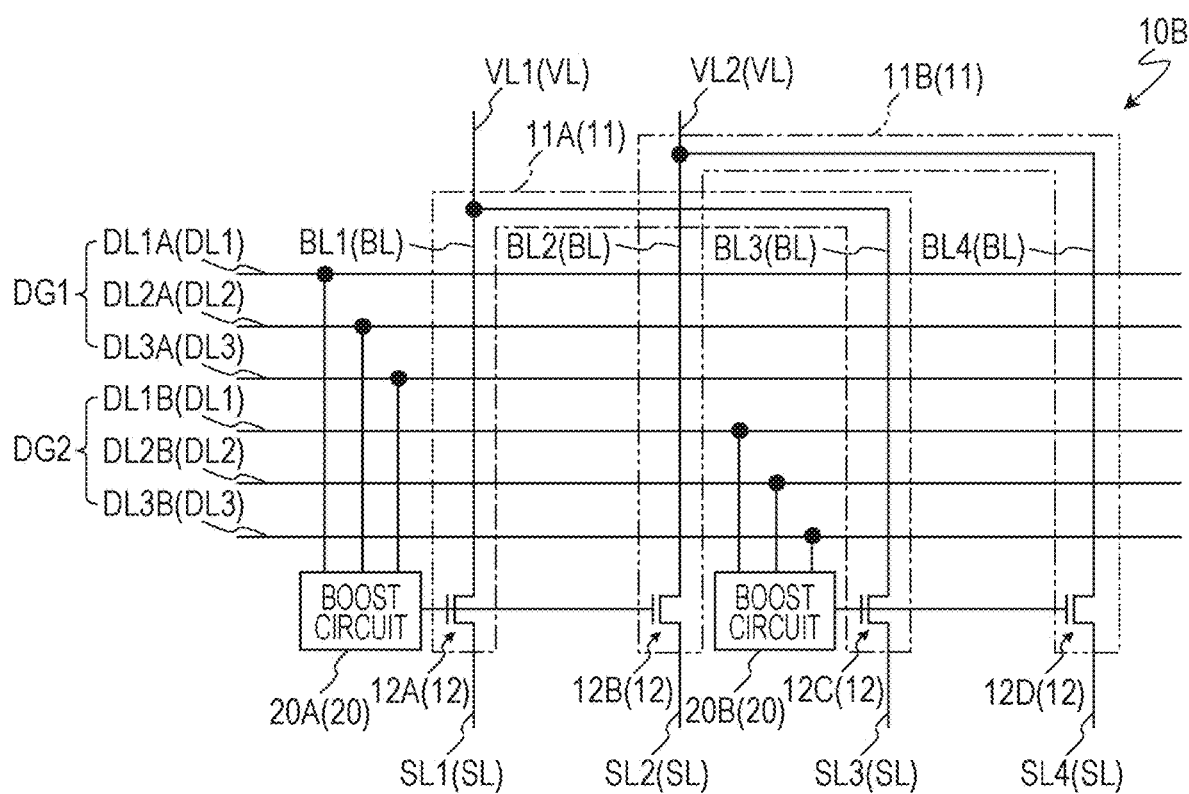
FIG. 17 is a view illustrating a configuration of a DEMUX circuit 10B included in an active matrix substrate of a third embodiment.

With reference to FIG. 17, an active matrix substrate of the present embodiment will be described. FIG. 17 is a view illustrating a configuration of a DEMUX circuit 10B included in the active matrix substrate of the present embodiment.

In the DEMUX circuit 10 shown in FIG. 2, the boost circuits 20 are connected to the switching TFTs 12 on a one-to-one basis. In contrast, in the DEMUX circuit 10B of the present embodiment, one boost circuit 20 is connected to two switching TFTs 12 as shown in FIG. 17. Specific description will be given below.

The two switching TFTs 12 included in a first unit circuit 11A are a first switching TFT 12A and a second switching TFT 12C which are brought into an ON state at different timings in one horizontal scan period. Similarly, the two switching TFTs 12 included in a second unit circuit 11B are a first switching TFT 12B and a second switching TFT 12D which are brought into the ON state at different timings in one horizontal scan period.

The boost circuit 20A of the two boost circuits 20A and 20B shown in FIG. 17 is commonly connected to the first switching TFT 12A of the first unit circuit 11A and the first switching TFT 12B of the second unit circuit 11B. The boost circuit 20B is commonly connected to the second switching TFT 12C of the first unit circuit 11A and the second switching TFT 12D of the second unit circuit 11B.

Thus, in the present embodiment, the two switching TFTs 12 which are simultaneously selected share one boost circuit 20. This enables the number of circuit elements to be reduced. Moreover, reducing the number of circuit elements reduces the load, and thus, it is possible to further reduce consumed power. Moreover, reducing the number of circuit elements also enables a circuit area to be reduced, and therefore, it is possible to reduce the layout size, and further frame narrowing is possible.

Fourth Embodiment

Figure 18:
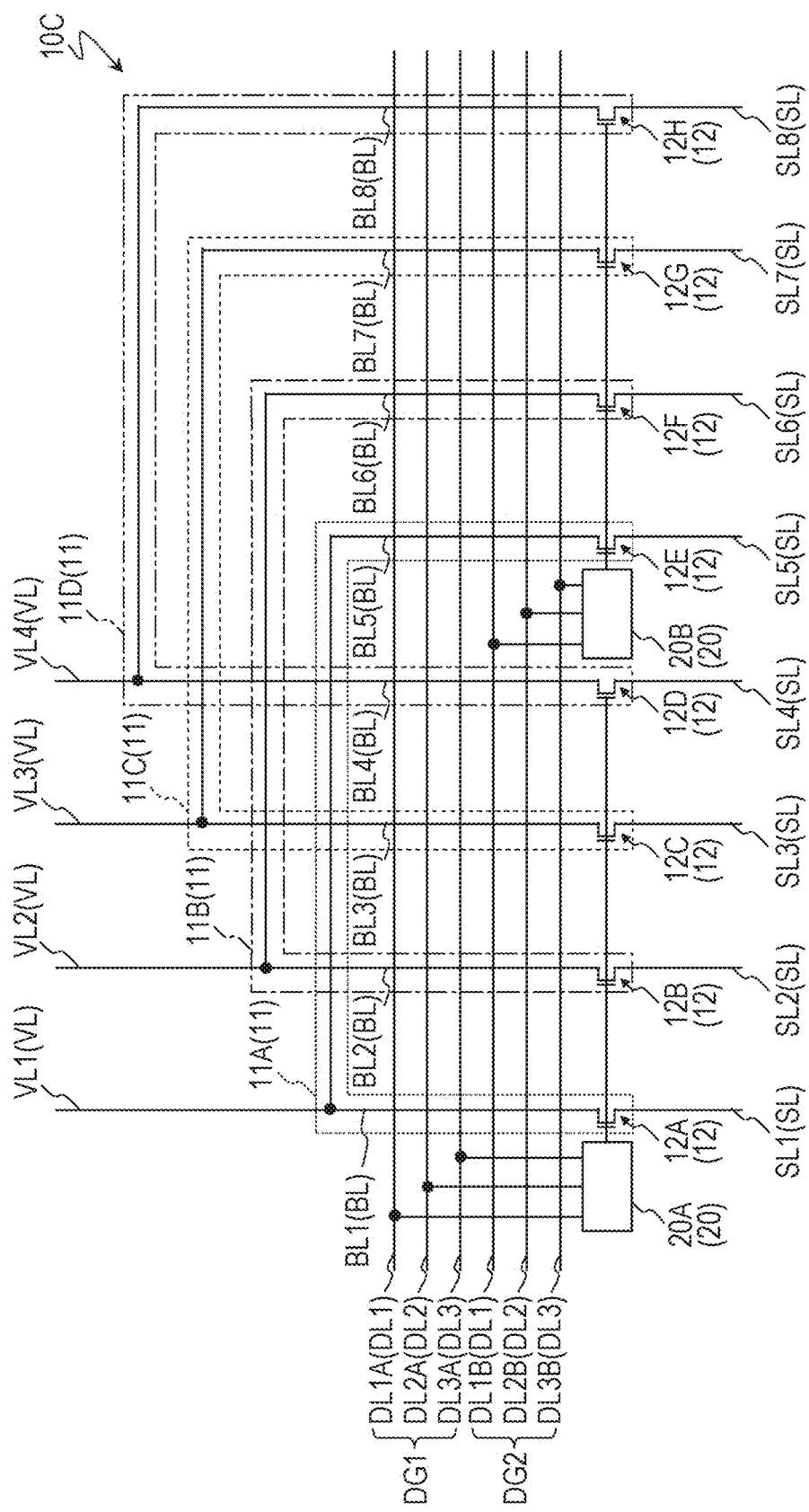
FIG. 18 is a view illustrating a configuration of a DEMUX circuit 10C included in an active matrix substrate of a fourth embodiment.

In the DEMUX circuit 10B in the third embodiment, the two switching TFTs 12 share one boost circuit 20, but three or more switching TFTs 12 may share one boost circuit 20. With reference to FIG. 18, an active matrix substrate of the present embodiment will be described below. FIG. 18 is a view illustrating a configuration of a DEMUX circuit 10C included in the active matrix substrate of the present embodiment.

FIG. 18 shows four unit circuits 11A, 11B, 11C, and 11D (hereinafter respectively referred to as a "first unit circuit", a "second unit circuit", a "third unit circuit", and a "fourth unit circuit") of a plurality of unit circuits 11 included in the DEMUX circuit 10C.

The first unit circuit 11A includes two branch lines BL1 and BL5 and two switching TFTs 12A and 12E and distributes a display signal from a signal output line VL1 to source bus lines SL1 and SL5. The two switching TFTs (first switching TFT and second switching TFT) 12A and 12E of the first unit circuit 11A are brought into an ON state at different timings in one horizontal scan period.

The second unit circuit 11B includes two branch lines BL2 and BL6 and two switching TFTs 12B and 12F and distributes a display signal from a signal output line VL2 to source bus lines SL2 and SL6. The two switching TFTs (first switching TFT and second switching TFT) 12B and 12F of the second unit circuit 11B are brought into the ON state at different timings in one horizontal scan period.

The third unit circuit 11C includes two branch lines BL3 and BL7 and two switching TFTs 12C and 12G and distributes a display signal from a signal output line VL3 to source bus lines SL3 and SL7. The two switching TFTs (first switching TFT and second switching TFT) 12C and 12G of the third unit circuit 11C are brought into the ON state at different timings in one horizontal scan period.

The fourth unit circuit 11D includes two branch lines BL4 and BL8 and two switching TFTs 12D and 12H and distributes a display signal from a signal output line VL4 to source bus lines SL4 and SL8. The two switching TFTs (first switching TFT and second switching TFT) 12D and 12H of the fourth unit circuit 11D are brought into the ON state at different timings during one horizontal scan period.

Of two boost circuits 20A and 20B shown in FIG. 18, the boost circuit 20A is commonly connected to the first switching TFT 12A of the first unit circuit 11A, the first switching TFT 12B of the second unit circuit 11B, the first switching TFT 12C of the third unit circuit 11C, and the first switching TFT 12D of the fourth unit circuit 11D. Moreover, the boost circuit 20B is commonly connected to the second switching TFT 12E of the first unit circuit 11A, the second switching TFT 12F of the second unit circuit 11B, the second switching TFT 12G of the third unit circuit 11C, and the second switching TFT 12H of the fourth unit circuit 11D.

Thus, in the present embodiment, four switching TFTs 12 which are simultaneously selected share one boost circuit 20. This enables the number of circuit elements to further be reduced as compared to the third embodiment in which two switching TFTs 12 share one boost circuit 20. Thus, it is possible to further reduce consumed power, and further frame narrowing is possible.

The present embodiment has described an example in which the four switching TFTs 12 share one boost circuit 20, but sharing one boost circuit 20 with three or more switching TFTs 12 enables the number of circuit elements to be more reduced than in the third embodiment. The three switching TFTs 12 which are simultaneously selected may share one boost circuit 20, or five or more switching TFTs 12 which are simultaneously selected may share one boost circuit 20.

Fifth Embodiment

Figure 19:
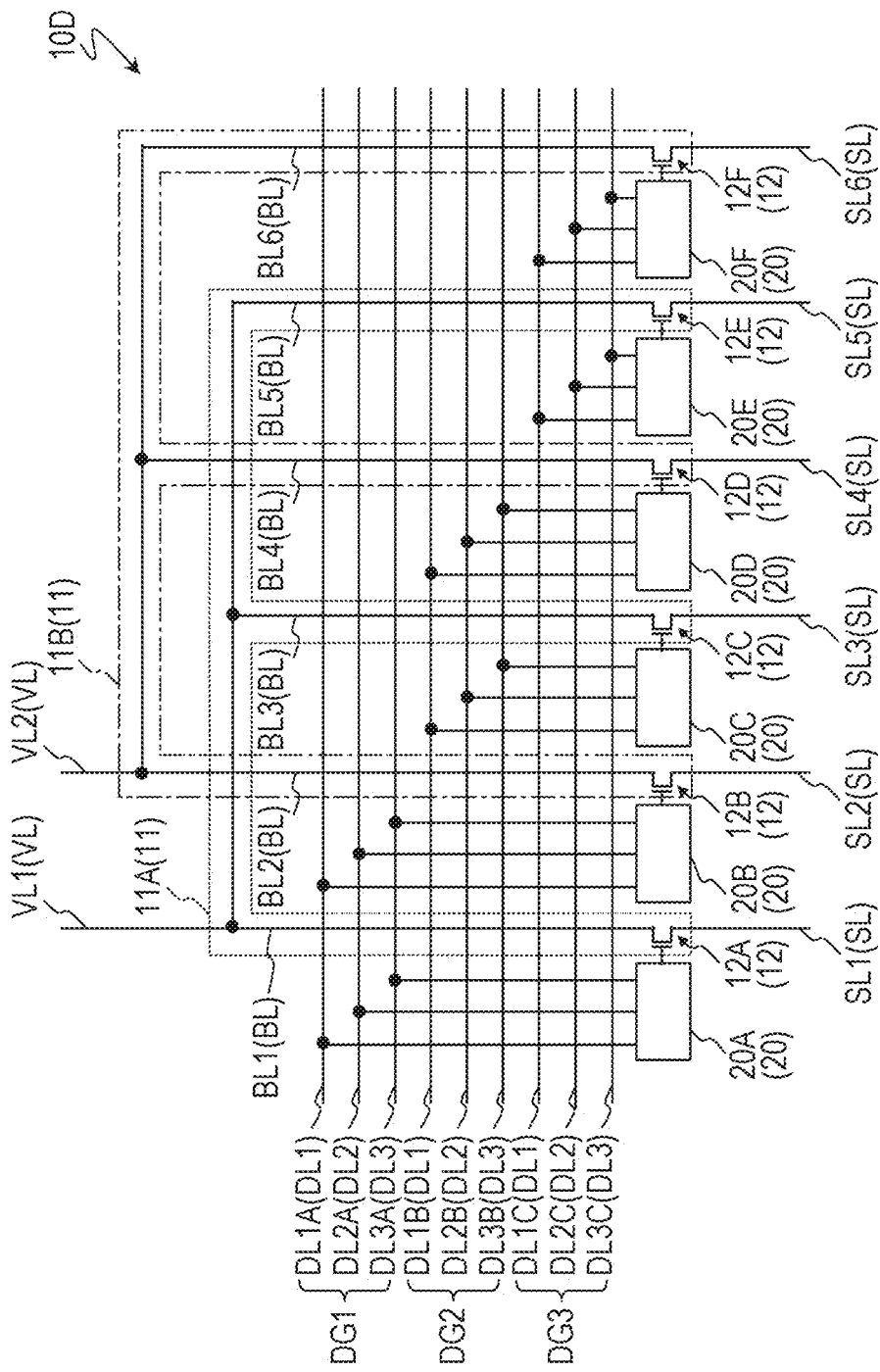
FIG. 19 is a view illustrating a configuration of a DEMUX circuit 10D included in an active matrix substrate of a fifth embodiment.

With reference to FIG. 19, an active matrix substrate of the present embodiment will be described. FIG. 19 is a view illustrating a configuration of a DEMUX circuit 10D included in the active matrix substrate of the present embodiment.

In the DEMUX circuits 10, 10A, 10B, and 10C respectively shown in FIGS. 2, 11, 17, and 18, each unit circuit 11 distributes a display signal from one signal output line VL to two source bus lines SL. In contrast, in the DEMUX circuit 10D of the present embodiment, each of a plurality of unit circuits 11 distributes a display signal from one signal output line VL to three source bus lines SL. Specific description will be given below.

FIG. 19 shows two unit circuits 11A and 11B (a first unit circuit and a second unit circuit) of the plurality of unit circuits 11 included in the DEMUX circuit 10D.

The first unit circuit 11A includes three branch lines BL1, BL3, and BL5 and three switching TFTs 12A, 12C, and 12E and distributes a display signal from one signal output line VL1 to three source bus lines SL1, SL3, and SL5.

The second unit circuit 11B includes three branch lines BL2, BL4, and BL6 and three switching TFTs 12B, 12D, and 12F and distributes a display signal from one signal output line VL2 to three source bus lines SL2, SL4, and SL6.

The DEMUX circuit 10D includes a plurality of boost circuits 20 configured to boost a voltage to be applied to gate electrodes of the three switching TFTs 12 of each unit circuit 11. In an example shown in FIG. 19, the boost circuits 20 are connected to the switching TFTs 12 on a one-to-one basis. Specifically, gate electrodes of the switching TFTs 12A, 12B, 12C, 12D, 12E, and 12F are respectively connected to output sides of boost circuits 20A, 20B, 20C, 20D, 20E, and 20F.

In the example shown in FIG. 19, three systems of drive signal line groups DG1, DG2, and DG3 are provided. The boost circuits 20A and 20B are driven by a first drive signal line DL1A, a second drive signal line DL2A, and a third drive signal line DL3A of the drive signal line group DG1. The boost circuits 20C and 20D are driven by a first drive signal line DL1B, a second drive signal line DL2B, and a third drive signal line DL3B of the drive signal line group DG2. The boost circuits 20E and 20F are driven by a first drive signal line DL1C, a second drive signal line DL2C, and a third drive signal line DL3C of the drive signal line group DG3.

Also in the active matrix substrate of the present embodiment, the DEMUX circuit 10D includes the boost circuits 20, and therefore, it is possible to reduce drive power in the same manner as in the active matrix substrate of the first to fourth embodiments. Moreover, in the present embodiment, each unit circuit 11 distributes a display signal from one signal output line VL to three source bus lines SL, and therefore, it is possible to reduce the number of signal output lines VL as compared to the first to fourth embodiments. Thus, a line region (region in which the signal output lines VL are disposed) is reduced to enable further frame narrowing. Moreover, the number of amplifiers of a source driver 6 which is mounted by using the COG technology can be reduced, and therefore, it is possible to further reduce the chip size. Thus, the number of chips obtained from a wafer is increased, and it is possible to reduce chip cost.

Figure 20:
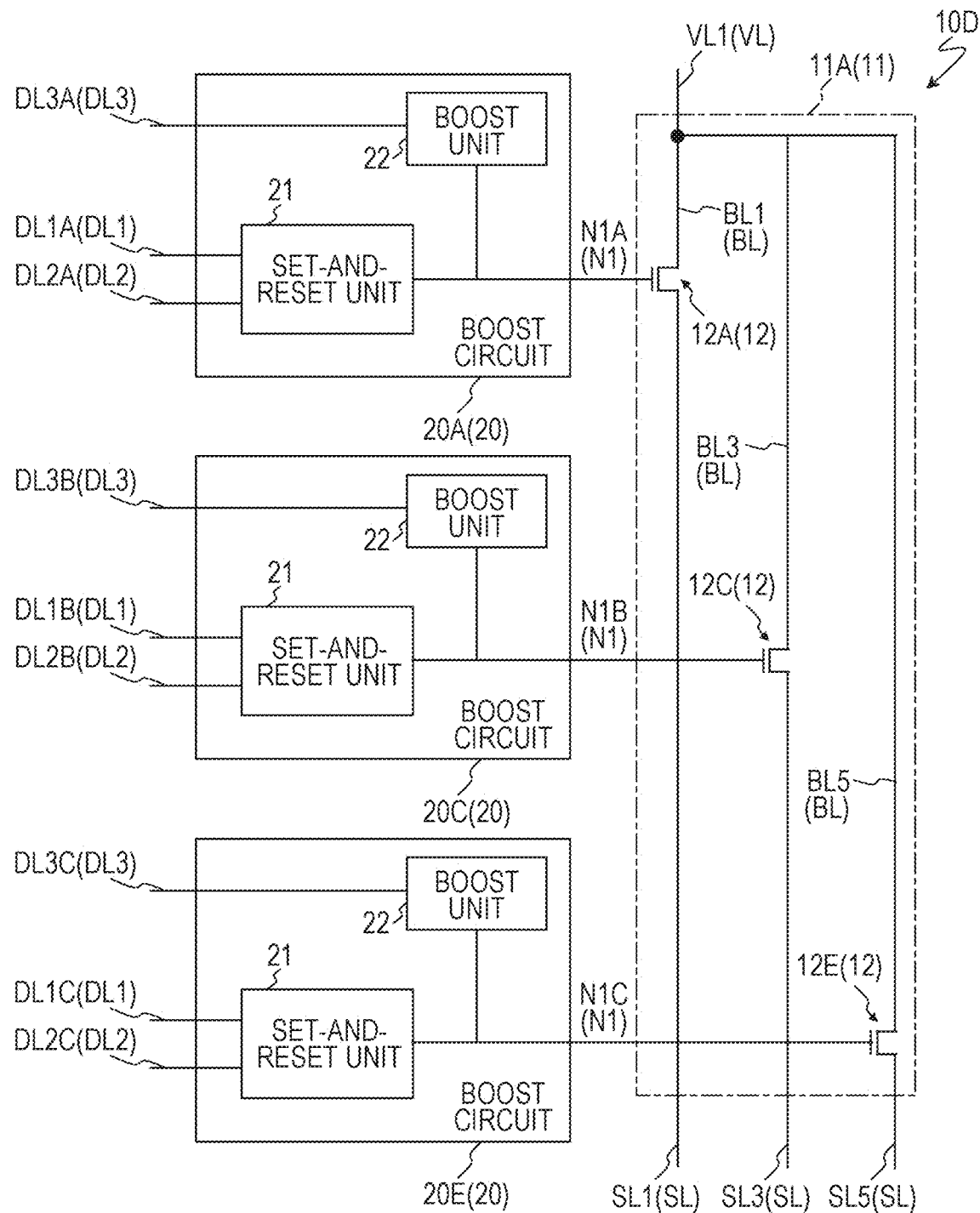
FIG. 20 is a view illustrating an example of a configuration of a boost circuit 20 included in the DEMUX circuit 10D.

FIG. 20 is a view illustrating an example of configurations of the boost circuits 20 of the DEMUX circuit 10D.

In the example shown in FIG. 20, each boost circuit 20 includes a set-and-reset unit 21 and a boost unit 22. The set-and-reset unit 21 and the boost unit 22 are connected to a node N1 connected to the gate electrode of the switching TFT 12. Moreover, the set-and-reset unit 21 is connected to a first drive signal line DL1 and a second drive signal line DL2, and the boost unit 22 is connected to a third drive signal line DL3.

The set-and-reset unit 21 is supplied with a first drive signal (set signal) via the first drive signal line DL1 to perform an operation of pre-charging (hereinafter referred to as "set operation") of the node N1. The first drive signal is a signal whose level changes at the start of at least the set operation. Moreover, the set-and-reset unit 21 is supplied with a second drive signal (reset signal) via the second drive signal line DL2 to perform an operation of resetting (hereinafter referred to as a "reset operation") of the node N1. The second drive signal is a signal whose level does not change at the start of the set operation and whose level is different from that of the first drive signal at the reset operation. The set operation and the reset operation by the set-and-reset unit 21 are performed at different timings.

The boost unit 22 is supplied with a third drive signal (boost signal) via the third drive signal line DL3 to boost the potential of the node N1 pre-charged by the set operation performed by the set-and-reset unit 21. The third drive signal is a signal whose level changes at the start of at least a boost operation.

Figure 21:
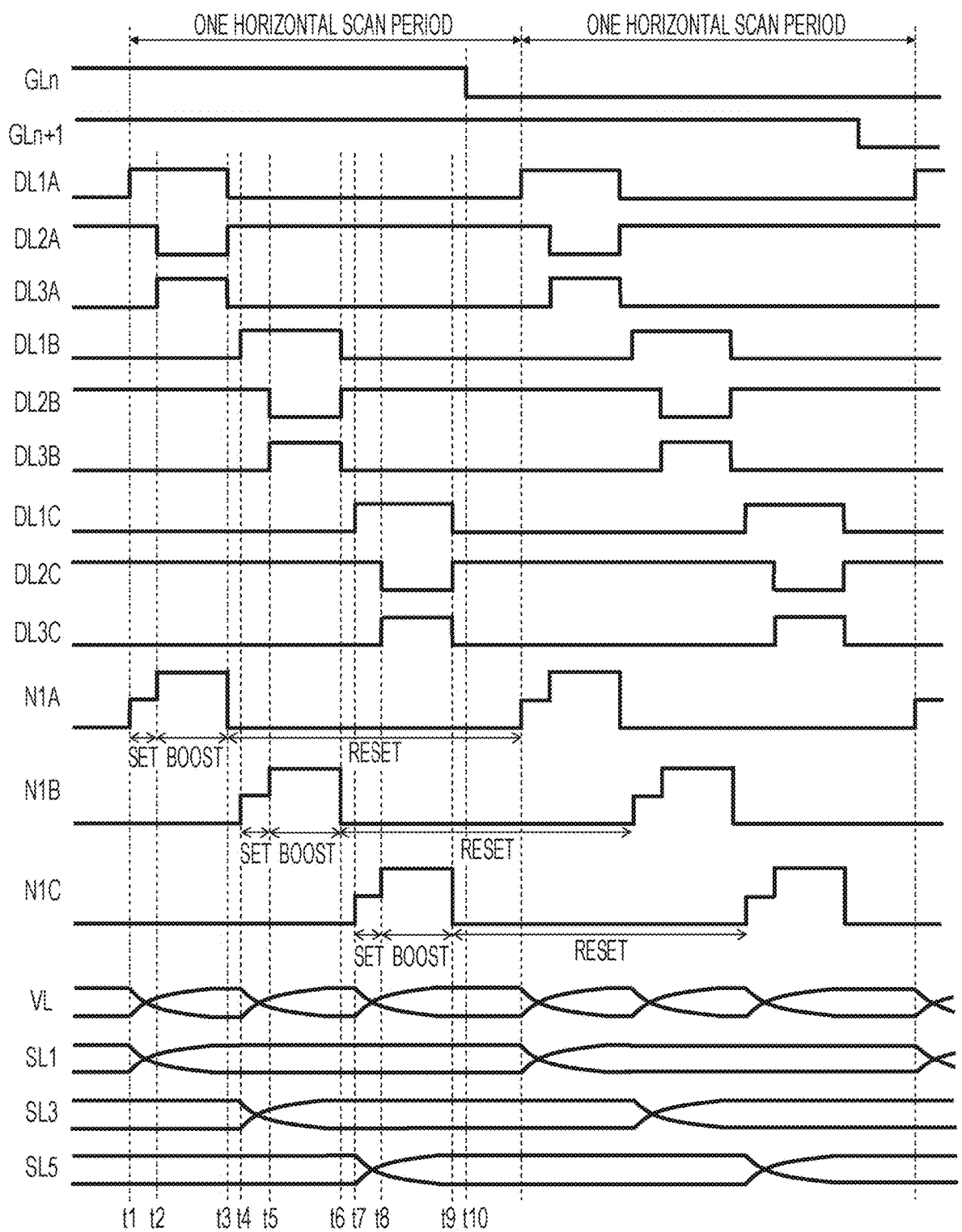
FIG. 21 is a timing diagram illustrating operation of the boost circuit 20 of the DEMUX circuit 10D.

With reference to also FIG. 21, operation (of the DEMUX circuit 10D) of the boost circuit 20 will now be described. FIG. 21 is a timing diagram illustrating the operation of the DEMUX circuit 10D.

First, at time t1, the potential of the first drive signal line DL1A transitions to a high level. At this time, the potential of the second drive signal line DL2A remains at the high level from the previous horizontal scan period, and the first drive signal is input as the set signal to the set-and-reset unit 21 of the boost circuit 20A. Thus, a node N1A connected to the gate electrode of the switching TFT 12A is pre-charged (set operation). Moreover, at this timing, the level of the potential of the signal output line VL (i.e., display signal) changes to a write voltage level to start charging of the source bus line SL1 selected.

Then, at time t2, the potential of the second drive signal DL2A transitions to a low level, the potential of the third drive signal line DL3A transitions to the high level, and the third drive signal is input as the boost signal to the boost unit 22 of the boost circuit 20A. This boosts the potential of the node N1A (boost operation). Boosting the potential of the node N1A satisfactorily charges the source bus line SL1 via the switching TFT 12A.

Subsequently, at time t3, the potential of the first drive signal line DL1A transitions to the low level, the potential of the second drive signal line DL2A transitions to the high level, the potential of the third drive signal line DL3A transitions to the low level, and the second drive signal is input as the reset signal to the set-and-reset unit 21 of the boost circuit 20A. Thus, the potential of the node N1A is reset (reset operation), and writing to the source bus line SL1 is completed.

Then, at time t4, the potential of the first drive signal line DL1B transitions to the high level. At this time, the potential of the second drive signal line DL2B remains at the high level from the previous horizontal scan period, and the first drive signal is input as the set signal to the set-and-reset unit 21 of the boost circuit 20C. Thus, a node N1B connected to the gate electrode of the switching TFT 12C is pre-charged (set operation). Moreover, at this timing, the level of the potential of the signal output line VL (i.e., display signal) changes to the write voltage level to start charging of the source bus line SL3 selected.

Subsequently, at time t5, the potential of the second drive signal DL2B transitions to the low level, the potential of the third drive signal line DL3B transitions to the high level, and the third drive signal is input as the boost signal to the boost unit 22 of the boost circuit 20C. This boosts the potential of the node N1B (boost operation). Boosting the potential of the node N1B satisfactorily charges the source bus line SL3 via the switching TFT 12C.

Then, at time t6, the potential of the first drive signal line DL1B transitions to the low level, the potential of the second drive signal line DL2B transitions to the high level, the potential of the third drive signal line DL3B transitions to the low level, and the second drive signal is input as the reset signal to the set-and-reset unit 21 of the boost circuit 20C. Thus, the potential of the node N1B is reset (reset operation), and writing to the source bus line SL3 is completed.

Subsequently, at time t7, the potential of the first drive signal line DL1C transitions to the high level. At this time, the potential of the second drive signal line DL2C remains at the high level from the previous horizontal scan period, and the first drive signal is input as the set signal to the set-and-reset unit 21 of the boost circuit 20E. Thus, a node N1C connected to the gate electrode of the switching TFT 12E is pre-charged (set operation). Moreover, at this timing, the level of the potential of the signal output line VL (i.e., display signal) changes to the write voltage level to start charging of the source bus line SL5 selected.

Subsequently, at time t8, the potential of the second drive signal DL2C transitions to the low level, the potential of the third drive signal line DL3C transitions to the high level, and the third drive signal is input as the boost signal to the boost unit 22 of the boost circuit 20E. This boosts the potential of the node N1C (boost operation). Boosting the potential of the node N1C satisfactorily charges the source bus line SL5 via the switching TFT 12E.

Then, at time t9, the potential of the first drive signal line DL1C transitions to the low level, the potential of the second drive signal line DL2C transitions to the high level, the potential of the third drive signal line DL3C transitions to the low level, and the second drive signal is input as the reset signal to the set-and-reset unit 21 of the boost circuit 20E. Thus, the potential of the node N1C is reset (reset operation), and writing to the source bus line SL5 is completed.

Thereafter, when the writing to the source bus lines SL1, SL3, and SL5 is completed (potential is determined), the gate signal supplied via a gate bus line GLn transitions to an OFF level (time t10), and writing of a display voltage to the pixel PIX is completed. Hereafter, the above-described operations are repeated to perform writing to all the gate bus lines GL.

Sixth Embodiment

Figure 22:
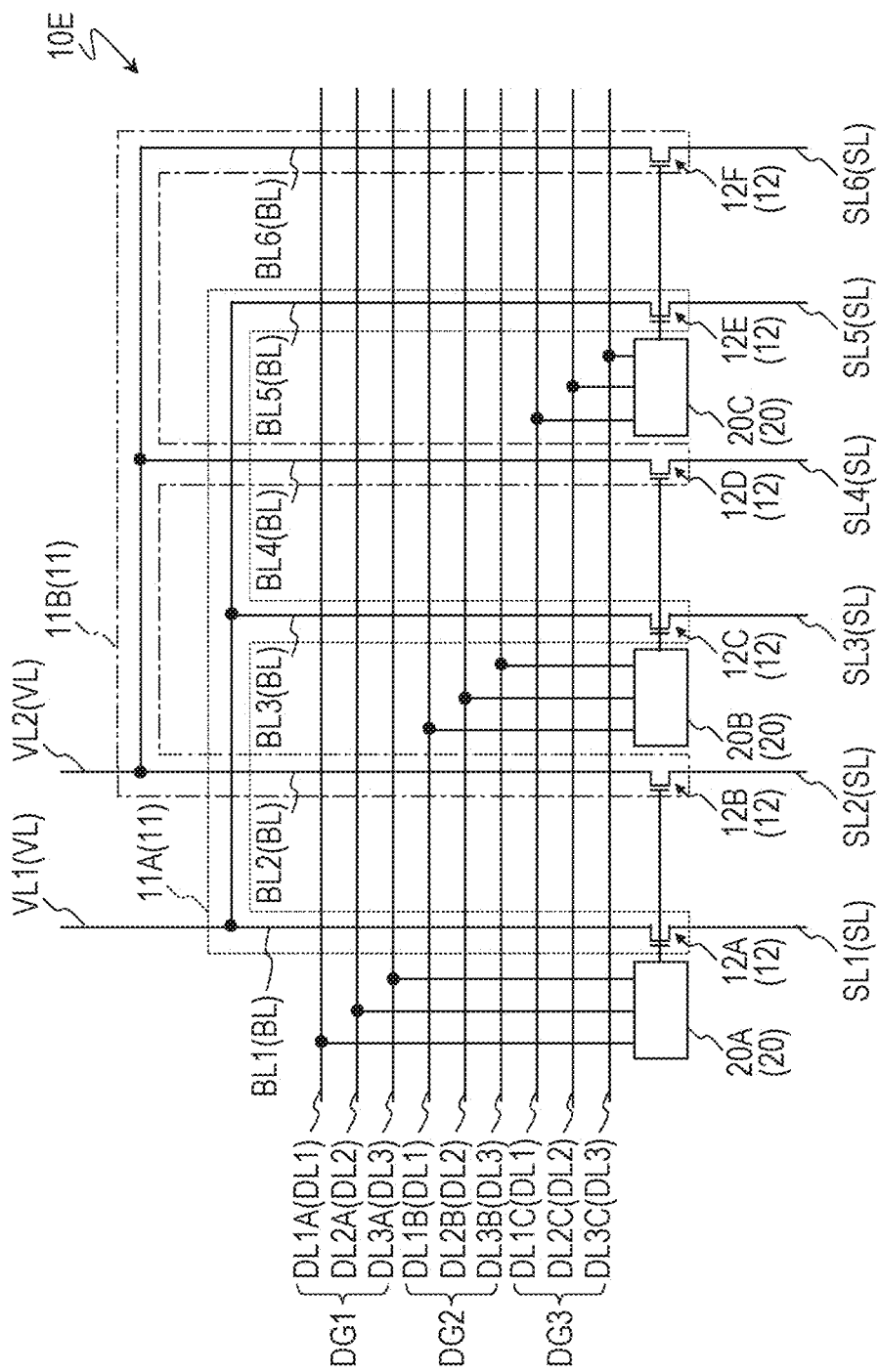
FIG. 22 is a view illustrating a configuration of a DEMUX circuit 10E included in an active matrix substrate of a sixth embodiment.

With reference to FIG. 22, an active matrix substrate of the present embodiment will be described. FIG. 22 is a view illustrating a configuration of a DEMUX circuit 10E included in the active matrix substrate of the present embodiment.

In the DEMUX circuit 10D shown in FIG. 19, the boost circuits 20 are connected to the switching TFTs 12 on a one-to-one basis. In contrast, in the DEMUX circuit 10E of the present embodiment, one boost circuit 20 is connected to two switching TFTs 12 as shown in FIG. 22. Specific description will be given below.

Three switching TFTs 12 included in a first unit circuit 11A are a first switching TFT 12A, a second switching TFT 12C, and a third switching TFT 12E which are brought into an ON state at different timings in one horizontal scan period. Similarly, three switching TFTs 12 included in a second unit circuit 11B are a first switching TFT 12B, a second switching TFT 12D, and a third switching TFT 12F which are brought into the ON state at different timings in one horizontal scan period.

Of three boost circuits 20A, 20B, and 20C shown in FIG. 22, the boost circuit 20A is commonly connected to the first switching TFT 12A of the first unit circuit 11A and the first switching TFT 12B of the second unit circuit 11B. Moreover, the boost circuit 20B is commonly connected to the second switching TFT 12C of the first unit circuit 11A and the second switching TFT 12D of the second unit circuit 11B. Furthermore, the boost circuit 20C is commonly connected to the third switching TFT 12E of the first unit circuit 11A and the third switching TFT 12F of the second unit circuit 11B.

Thus, in the present embodiment, the two switching TFTs 12 which are simultaneously selected share one boost circuit 20. This enables the number of circuit elements to be reduced. Moreover, reducing the number of circuit elements reduces the load, and thus, it is possible to further reduce consumed power. Moreover, reducing the number of circuit elements also enables a circuit area to be reduced, and therefore, it is possible to reduce the layout size, and further frame narrowing is possible.

Seventh Embodiment

Figure 23:
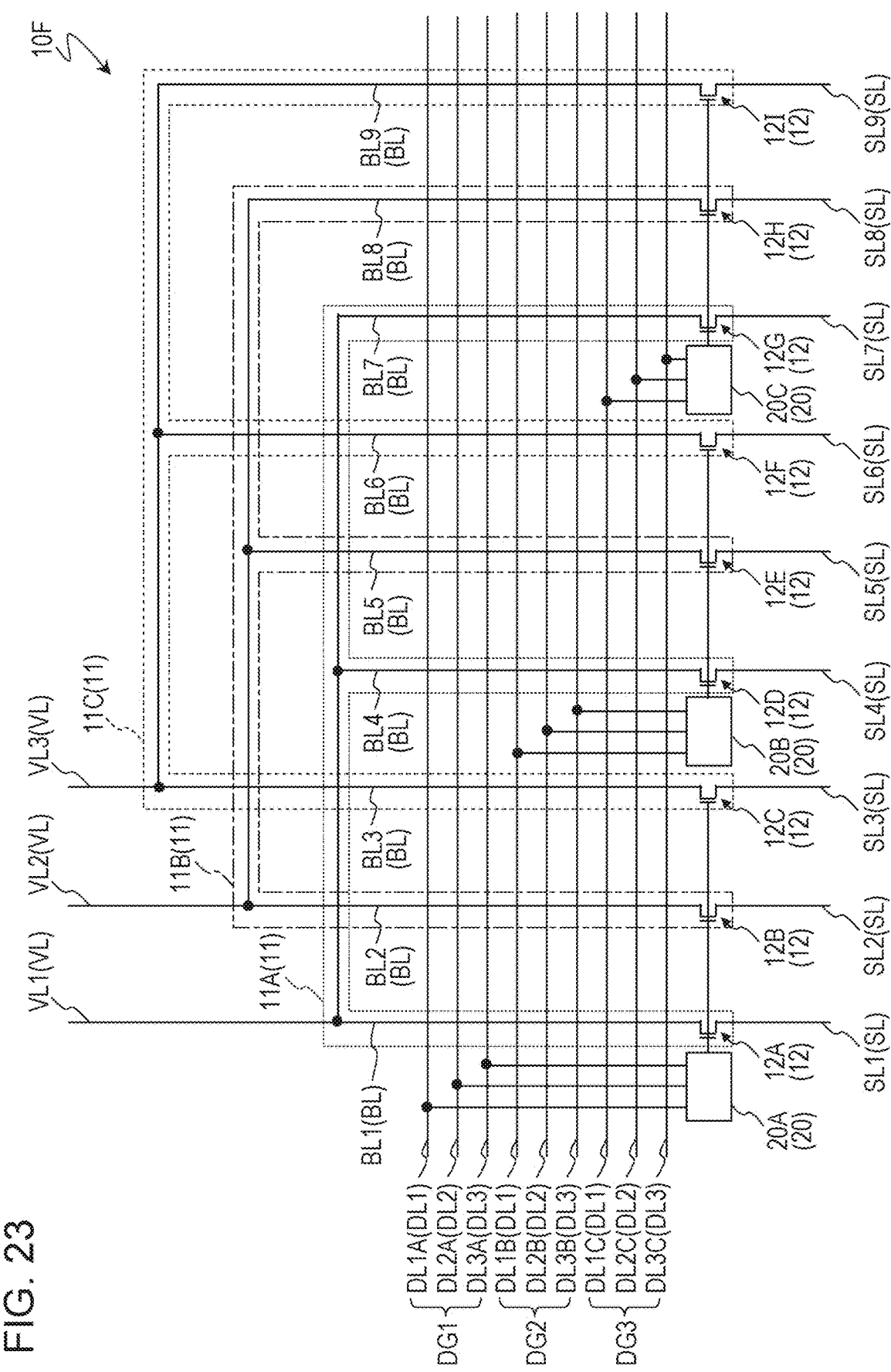
FIG. 23 is a view illustrating a configuration of a DEMUX circuit 10F included in an active matrix substrate of a seventh embodiment.

In the DEMUX circuit 10E in the sixth embodiment, the two switching TFTs 12 share one boost circuit 20, but three or more switching TFTs 12 may share one boost circuit 20. With reference to FIG. 23, an active matrix substrate of the present embodiment will be described below. FIG. 23 is a view illustrating a configuration of a DEMUX circuit 10F included in the active matrix substrate of the present embodiment.

FIG. 23 shows three unit circuits 11A, 11B, and 11C (hereinafter respectively referred to as a "first unit circuit", a "second unit circuit", and a "third unit circuit") of a plurality of unit circuits 11 included in the DEMUX circuit 10F.

The first unit circuit 11A includes three branch lines BL1, BL4, and BL7 and three switching TFTs 12A, 12D, and 12G and distributes a display signal from a signal output line VL1 to source bus lines SL1, SL4, and SL7. The three switching TFTs (first switching TFT, second switching TFT, and third switching TFT) 12A, 12D, and 12G of the first unit circuit 11A are brought into an ON state at different timings in one horizontal scan period.

The second unit circuit 11B includes three branch lines BL2, BL5, and BL8 and three switching TFTs 12B 12E, and 12H and distributes a display signal from a signal output line VL2 to source bus lines SL2, SL5, and SL8. The three switching TFTs (first switching TFT, second switching TFT, and third switching TFT) 12B, 12E, and 12H of the second unit circuit 11B are brought into the ON state at different timings in one horizontal scan period.

The third unit circuit 11C includes three branch lines BL3, BL6, and BL9 and three switching TFTs 12C, 12F, and 12I and distributes a display signal from a signal output line VL3 to source bus lines SL3, SL6, and SL9. The three switching TFTs (first switching TFT, second switching TFT, and third switching TFT) 12C, 12F, and 12I of the third unit circuit 11C are brought into the ON state at different timings in one horizontal scan period.

Of three boost circuits 20A, 20B, and 20C shown in FIG. 23, the boost circuit 20A is commonly connected to the first switching TFT 12A of the first unit circuit 11A, the first switching TFT 12B of the second unit circuit 11B, and the first switching TFT 12C of the third unit circuit 11C. Moreover, the boost circuit 20B is commonly connected to the second switching TFT 12D of the first unit circuit 11A, the second switching TFT 12E of the second unit circuit 11B, and the second switching TFT 12F of the third unit circuit 11C. Furthermore, the boost circuit 20C is commonly connected to the third switching TFT 12G of the first unit circuit 11A, the third switching TFT 12H of the second unit circuit 11B, and the third switching TFT 12I of the third unit circuit 11C.

Thus, in the present embodiment, three switching TFTs 12 which are simultaneously selected share one boost circuit 20. This enables the number of circuit elements to further be reduced as compared to the sixth embodiment in which two switching TFTs 12 share one boost circuit 20. Thus, it is possible to further reduce consumed power, and further frame narrowing is possible.

The present embodiment has described an example in which the three switching TFTs 12 share one boost circuit 20, but four or more switching TFTs 12 may share one boost circuit 20.

Eighth Embodiment

Figure 24:
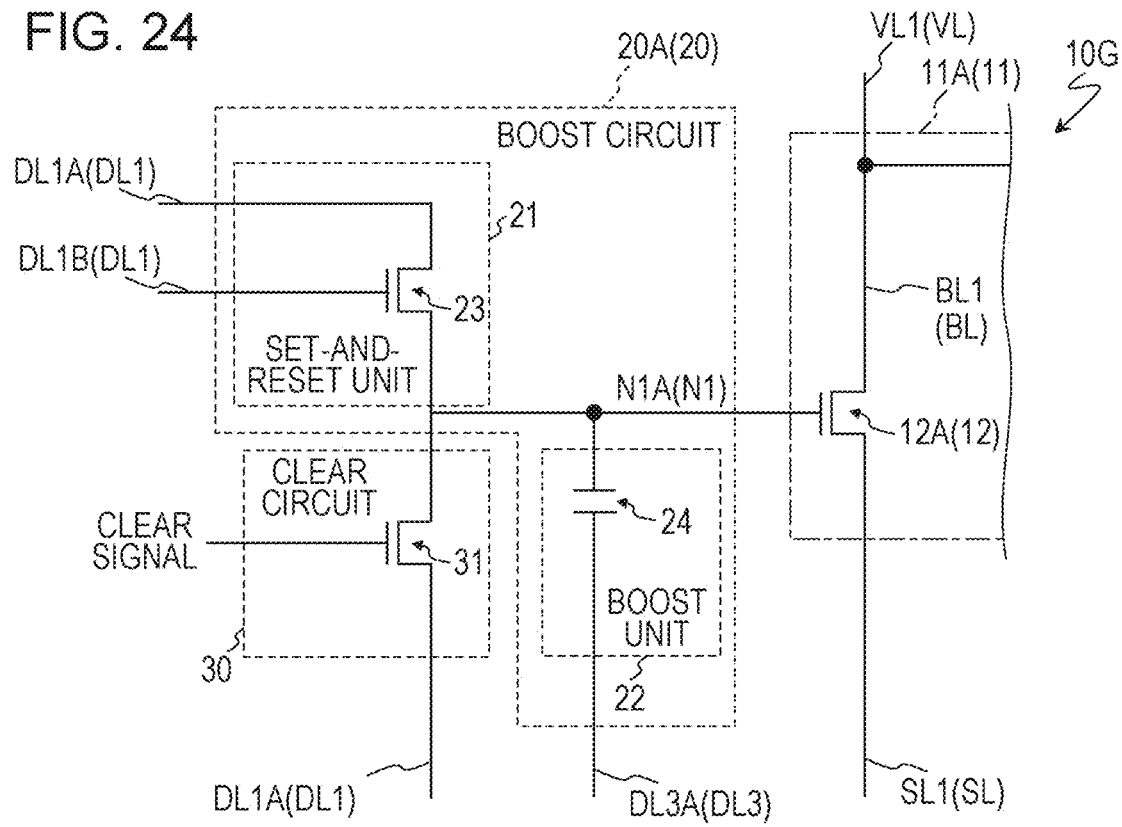
FIG. 24 is a view illustrating a configuration of a DEMUX circuit 10G included in an active matrix substrate of an eighth embodiment.

With reference to FIG. 24, an active matrix substrate of the present embodiment will be described. FIG. 24 is a view illustrating a configuration of a DEMUX circuit 10G included in the active matrix substrate of the present embodiment.

As illustrated in FIG. 24, the DEMUX circuit 10G further includes a plurality of clear circuits 30 each connected to a corresponding one of boost circuits 20 (in FIG. 24, one clear circuit 30 is shown). Each of the clear circuits 30 is configured to initialize the corresponding one of the boost circuits 20 at a prescribed timing.

In an example shown in FIG. 24, the clear unit 30 includes a TFT (hereinafter referred to as a "clearing TFT") 31. The clearing TFT 31 has a gate electrode to which a clear signal is supplied. The clearing TFT 31 has a source electrode connected to the first drive signal line DL1 (DL1A), and the clearing TFT 31 has a drain electrode connected to a node N1.

In the DEMUX circuit 10G including the clear circuits 30, when the clear signal supplied to the gate electrode of the clearing TFT 31 reaches a high level, a boost circuit 20 is initialized. Initialization of the boost circuit 20 by the clear circuit 30 is performed, for example, at the beginning or at the end of a drive period.

When the boost circuit 20 is initialized at the beginning of the drive period, the boost circuit 20 starts operating from an initialized state, and therefore, it is possible to reduce unexpected operation and/or unexpected output. Alternatively, initializing the boost circuit 20 at the end of the drive period enables charges (accumulated by drive) of each node to be discharged, and therefore, it is possible to prevent TFTs from being deteriorated due to charges remaining at the stop of the operation.

Ninth Embodiment

Figure 25:
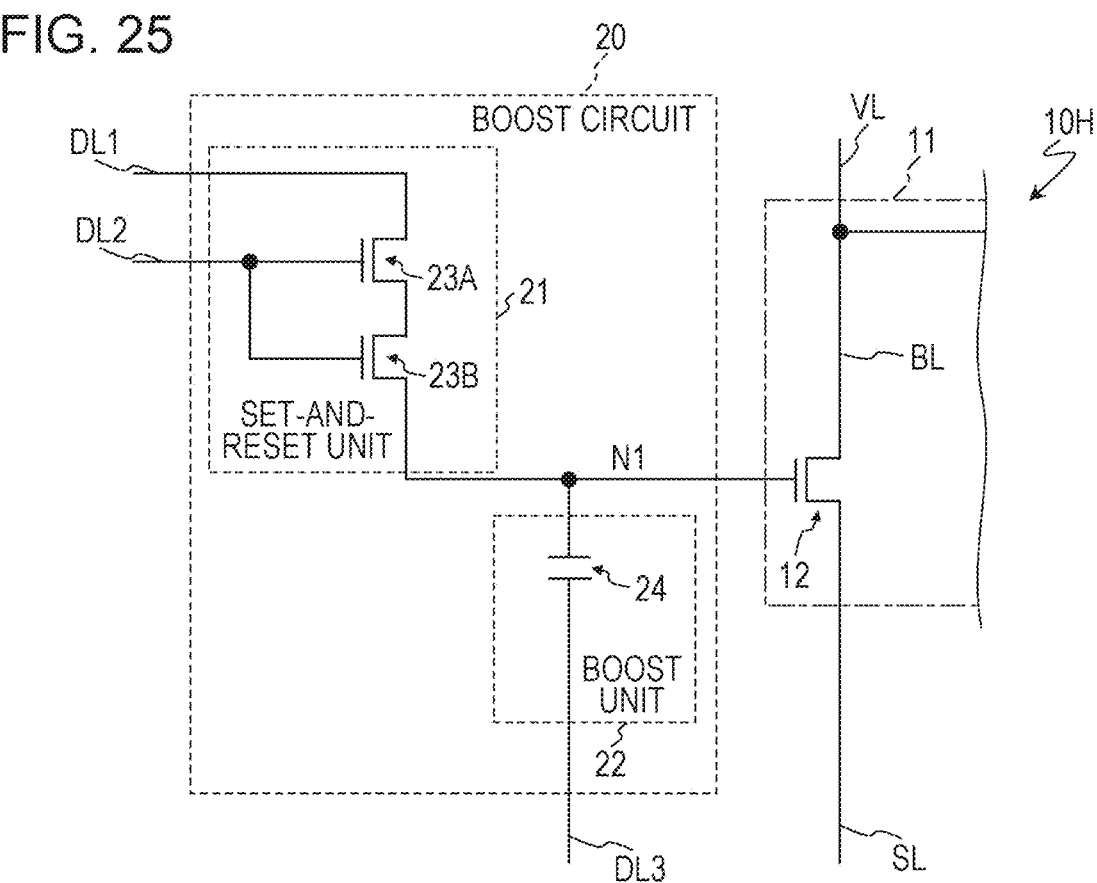
FIG. 25 is a view illustrating a configuration of a DEMUX circuit 10H included in an active matrix substrate of a ninth embodiment.

With reference to FIG. 25, an active matrix substrate of the present embodiment will be described. FIG. 25 is a view illustrating a configuration of a DEMUX circuit 10H included in the active matrix substrate of the present embodiment.

In the DEMUX circuit 10H, as illustrated in FIG. 25, a set-and-reset unit 21 of a boost circuit 20 includes a plurality of (here two) setting-and-resetting TFTs 23A and 23B (hereinafter respectively referred to as a "first setting-and-resetting TFT" and a "second setting-and-resetting TFT") connected to each other in series.

The first setting-and-resetting TFT 23A and the second setting-and-resetting TFT 23B include gate electrodes connected to a second drive signal line DL2. The first setting-and-resetting TFT 23A has a drain electrode connected to a first drive signal line DL1. The first setting-and-resetting TFT 23A has a source electrode connected to the drain electrode of the second setting-and-resetting TFT 23B. The second setting-and-resetting TFT 23B has a source electrode connected to a node N1.

As described above, the set-and-reset unit 21 of the boost circuit 20 includes the plurality of setting-and-resetting TFTs 23A and 23B which are connected to each other in series, and therefore, when the boost circuit 20 operates to boost the node N1, it is possible to reduce (in the shown example, substantially halve) a potential difference given between the source and the drain of each TFT. That is, pressure proof can be improved.

Tenth Embodiment

Figure 26:
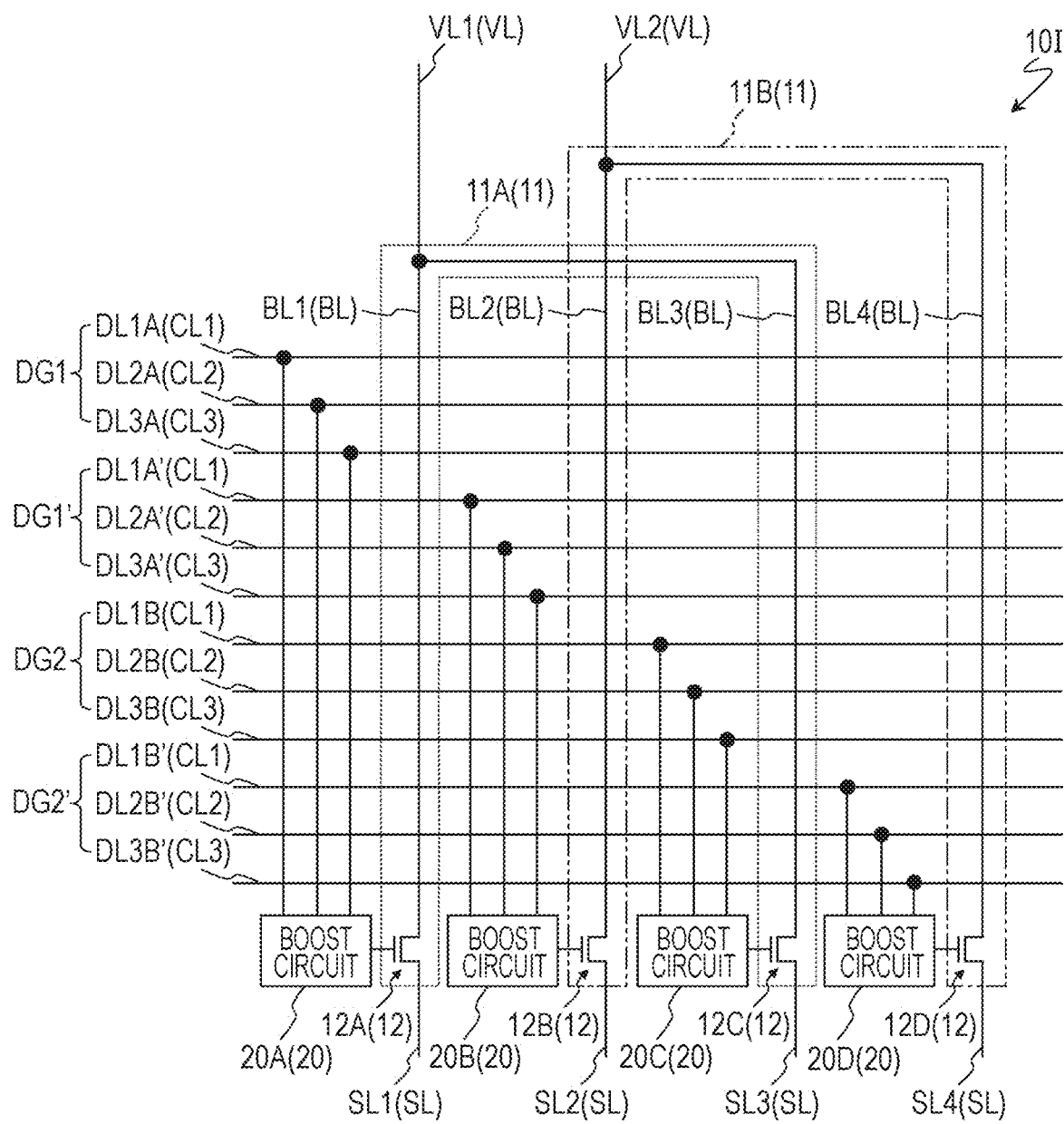
FIG. 26 is a view illustrating a configuration of a DEMUX circuit 10I included in an active matrix substrate of a tenth embodiment.

With reference to FIG. 26, an active matrix substrate of the present embodiment will be described. FIG. 26 is a view illustrating a configuration of a DEMUX circuit 10I included in the active matrix substrate of the present embodiment.

The DEMUX circuit 10I shown in FIG. 26 is different from the DEMUX circuit 10 shown in FIG. 2 in that the DEMUX circuit 10I further includes drive signal line groups DG1' and DG2' in addition to the drive signal line groups DG1 and DG2.

Of four boost circuits 20 shown in FIG. 26, a boost circuit 20A is driven by the drive signal line group DG1, and a boost circuit 20B is driven by the drive signal line group DG1'. Moreover, a boost circuit 20C is driven by the drive signal line group DG2, and a boost circuit 20D is driven by the drive signal line group DG2'.

In the DEMUX circuit 10 shown in FIG. 2, the boost circuit 20A and the boost circuit 20B which are driven at the same timing are driven by the same drive signal line group DG1. Moreover, the boost circuit 20C and the boost circuit 20D which are driven at the same timing are driven by the same drive signal line group DG2.

In contrast, in the DEMUX circuit 10I shown in FIG. 26, the boost circuit 20A and the boost circuit 20B which are driven at the same timing are respectively driven by drive signal line groups DG1 and DG1'. Moreover, the boost circuit 20C and the boost circuit 20D which are driven at the same timing are respectively driven by drive signal line groups DG2 and DG2'.

The drive signal line groups DG1 and DG1' are supplied with drive signals subjected to phase evolution, the drive signals being signals for driving the boost circuits 20 at a timing. That is, the drive signal line groups DG1 and DG1' are different line groups via which substantially the same signals are supplied.

The drive signal line groups DG2 and DG2' are supplied with drive signals subjected to phase evolution, the drive signals being signals for driving the boost circuits 20 at another timing. That is, the drive signal line groups DG2 and DG2' are different line groups via which substantially the same signals are supplied.

As described above, the present embodiment includes: a line group via which a drive signal group for driving some boost circuits 20 of the two or more boost circuits 20 driven at the same timing is supplied; and another line group via which a drive signal group for driving some other of the two or more boost circuits 20 driven at the same timing is supplied. Since this enables the number of circuits connected to one drive signal line to be reduced, the load across each drive signal line is reduced, and it is possible to reduce a transition time (rise time and fall time) of the drive signal. Thus, operating at an increased speed becomes possible.

[As to Oxide Semiconductor]

An oxide semiconductor included in an oxide semiconductor layer of the switching TFT 12 may be an amorphous oxide semiconductor or may be a crystalline oxide semiconductor including a crystalline part. Examples of the crystalline oxide semiconductor include a polycrystalline oxide semiconductor, a microcrystalline oxide semiconductor, and a crystalline oxide semiconductor having a c-axis oriented substantially perpendicular to a layer surface.

The oxide semiconductor layer may have a layered structure including two or more layers. When the oxide semiconductor layer has the layered structure, the oxide semiconductor layer may include an amorphous oxide semiconductor layer and a crystalline oxide semiconductor layer, may include a plurality of crystalline oxide semiconductor layers having different crystal structures, or may include a plurality of amorphous oxide semiconductor layers. When the oxide semiconductor layer has a two-layer structure including an upper layer and a lower layer, the energy gap of an oxide semiconductor included in the upper layer is preferably larger than the energy gap of an oxide semiconductor included in the lower layer. Note that when the difference between the energy gaps of these layers is relatively small, the energy gap of the oxide semiconductor included in the lower layer may be larger than the energy gap of the oxide semiconductor included in the upper layer.

The material, the structure, the film formation method, the configuration of an oxide semiconductor layer having a layered structure, and the like of an amorphous oxide semiconductor and each crystalline oxide semiconductor described above are described in, for example, Japanese Unexamined Patent Application Publication No. 2014-007399. For reference, the entire disclosure of Japanese Unexamined Patent Application Publication No. 2014-007399 is herein incorporated by reference.

The oxide semiconductor layer may include, for example, at least one metallic element of In, Ga, or Zn. In the embodiment of the present invention, the oxide semiconductor layer includes, for example, an In—Ga—Zn—O-based semiconductor (for example, Indium Gallium Zinc Oxide). Here, the In—Ga—Zn—O-based semiconductor is a ternary oxide of indium (In), gallium (Ga), and zinc (Zn), and the ratio (composition ratio) of In, Ga, and Zn is not particularly limited, and examples of the ratio include In:Ga:Zn=2:2:1, In:Ga:Zn=1:1:1, and In:Ga:Zn=1:1:2. The oxide semiconductor layer can be formed of an oxide semiconductor film including an In—Ga—Zn—O-based semiconductor.

The In—Ga—Zn—O-based semiconductor may be amorphous or crystalline. The crystalline In—Ga—Zn—O-based semiconductor is preferably a crystalline In—Ga—Zn—O-based semiconductor having the c-axis oriented substantially perpendicular to the layer surface.

Note that the crystal structure of the crystalline In—Ga—Zn—O-based semiconductor is disclosed in, for example, Japanese Unexamined Patent Application Publication No. 2014-007399 described above, Japanese Unexamined Patent Application Publication No. 2012-134475, and Japanese Unexamined Patent Application Publication No. 2014-209727. For reference, the entire disclosure of Japanese Unexamined Patent Application Publication No. 2012-134475 and Japanese Unexamined Patent Application Publication No. 2014-209727 is herein incorporated by reference. A TFT having an In—Ga—Zn—O-based semiconductor layer has high mobility (more than 20 times that of a-SiTFT) and a low leakage current (less than one hundredth that of a-SiTFT) and is thus appropriately used as the TFT switching TFT 12, and is alternatively used as a drive TFT (e.g., a TFT included in a drive circuit which is provided in the periphery of the display region including a plurality of pixels and which is provided on the same substrate as the display region) or a pixel TFT (TFT provided in a pixel).

The oxide semiconductor layer may include another oxide semiconductor instead of an In—Ga—Zn—O-based semiconductor. The oxide semiconductor layer may include, for example, In—Sn—Zn—O-based semiconductor (e.g., $In_2O_3$—$SnO_2$—ZnO; InSnZnO). The In—Sn—Zn—O-based semiconductor is a ternary oxide of indium (In), tin (Sn), and zinc (Zn). Alternatively, the oxide semiconductor layer may include an In—Al—Zn—O-based semiconductor, an In—Al—Sn—Zn—O-based semiconductor, a Zn—O-based semiconductor, an In—Zn—O-based semiconductor, a Zn—Ti—O-based semiconductor, a Cd—Ge—O-based semiconductor, a Cd—Pb—O-based semiconductor, a CdO (cadmium oxide), a Mg—Zn—O-based semiconductor, an In—Ga—Sn—O-based semiconductor, an In—Ga—O-based semiconductor, a Zr—In—Zn—O-based semiconductor, a Hf—In—Zn—O-based semiconductor, and the like.

Eleventh Embodiment

Figure 27:
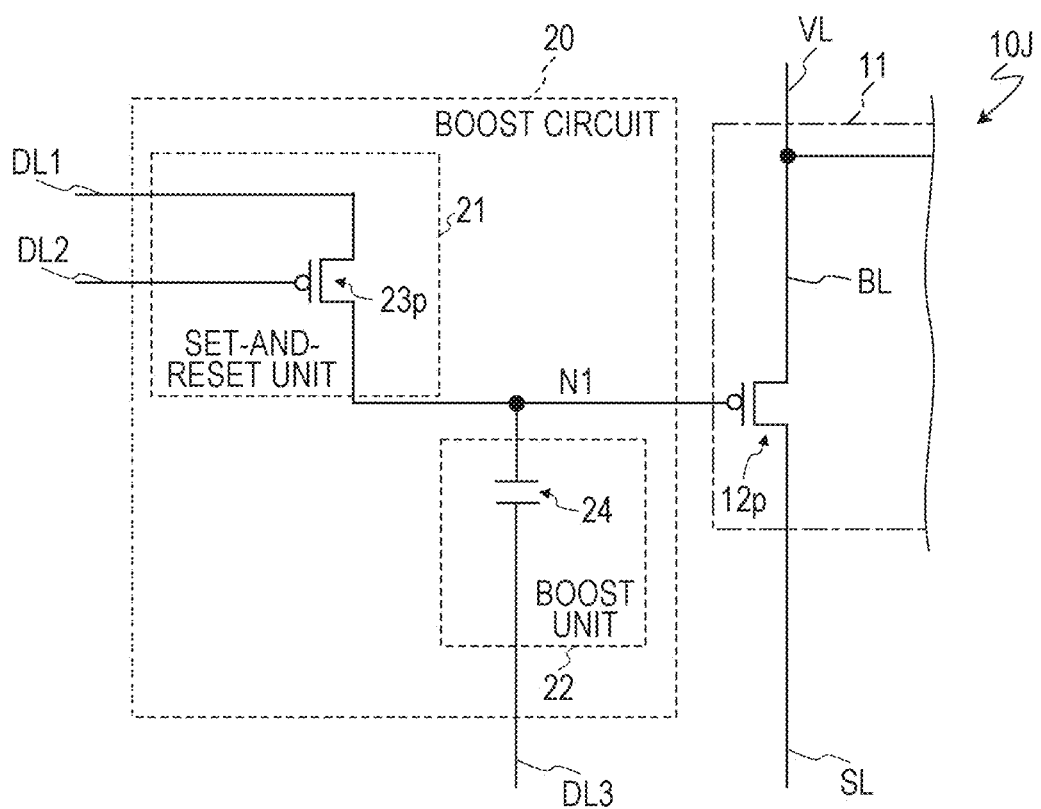
FIG. 27 is a view illustrating a configuration of a DEMUX circuit 10J included in an active matrix substrate of an eleventh embodiment.

With reference to FIG. 27, an active matrix substrate of the present embodiment will be described. FIG. 27 is a view illustrating a configuration of a DEMUX circuit 10J included in the active matrix substrate of the present embodiment.

The DEMUX circuit 10J shown in FIG. 27 is different from the DEMUX circuit 10 of FIG. 5 in that a switching TFT 12p of each unit circuit 11 is a PMOS transistor including a polycrystalline silicon semiconductor layer (e.g., a low-temperature polysilicon (LTPS) layer) as an active layer. Moreover, in the DEMUX circuit 10J, other TFTs included in the circuit are PMOS transistors including polycrystalline silicon semiconductor layers. Thus, a setting-and-resetting TFT 23p of a set-and-reset unit 21 is also a PMOS transistor including a polycrystalline silicon semiconductor layer.

As the DEMUX circuits 10J shown in FIG. 27, also when the DEMUX circuit includes a PMOS transistor, timing and the like for driving are the same as those for the DEMUX circuit 10 shown in FIG. 2 except for only that the polarity of a signal or the like is reversed. That is, when the first drive signal and the second drive signal are each at the low level, the set operation is performed. Moreover, when the third drive signal is at the low level, the boost operation is performed, and when the first drive signal is at the high level and the second drive signal is at the low level, the reset operation is performed.

As already described, the polycrystalline silicon has higher mobility than the oxide semiconductor, but the PMOS has lower mobility than the NMOS. Thus, when only the PMOS transistor including a polycrystalline silicon semiconductor layer as an active layer is used as the DEMUX circuit TFT, the same problem as in the case of using an oxide semiconductor TFT occurs.

As in the present embodiment, when the DEMUX circuit 10J includes boost circuits 20, a reduction of drive power and frame narrowing can be realized.

(Display Device)

An active matrix substrate (semiconductor device) according to an embodiment of the present invention is appropriately adopted in display devices. Note that description has been given of an example of an active matrix substrate of a liquid crystal display device configured to perform display in a lateral electric field mode such as a FFS mode. However, the active matrix substrate of the present invention is applicable to an active matrix substrate of a liquid crystal display device configured to perform display in a vertical electric field mode (e.g., a TN mode and a vertical alignment mode) in which a voltage is applied in a thickness direction of the liquid crystal layer. An active matrix substrate according to an embodiment of the present invention is appropriately adopted also in display devices other than liquid crystal display devices (display devices including display medium layer other than a liquid crystal layer). For example, an active matrix substrate according to an embodiment of the present invention is adopted, for example, in electrophoretic display devices and organic electroluminescence (EL) display devices.

The liquid crystal display device may include an active matrix substrate, a counter substrate facing the active matrix substrate, and a liquid crystal layer disposed between the active matrix substrate and the counter substrate. The organic EL display device includes an active matrix substrate and an organic EL layer provided on the active matrix substrate.

INDUSTRIAL APPLICABILITY

According to the embodiment of the present invention, it is possible to reduce drive power of an active matrix substrate including a demultiplexer circuit. An active matrix substrate according to an embodiment of the present invention is appropriately adopted in various types of display devices.

REFERENCE SIGNS LIST

1 SUBSTRATE
2 THIN FILM TRANSISTOR (PIXEL TFT)
3 PIXEL ELECTRODE
4 COMMON ELECTRODE
5A, 5B GATE DRIVER
5a SHIFT REGISTER CIRCUIT
6 SOURCE DRIVER
10, 10A, 10B, 10C, 10D, 10E DEMULTIPLEXER CIRCUIT
10F, 10G, 10H, 10I, 10J DEMULTIPLEXER CIRCUIT

11 UNIT CIRCUIT
12, 12p SWITCHING TFT
20 BOOST CIRCUIT
21 SET-AND-RESET UNIT
22 BOOST UNIT
23, 23A, 23B, 23p SETTING-AND-RESETTING TFT
24 BOOSTING CAPACITIVE ELEMENT
30 CLEAR CIRCUIT
31 CLEARING TFT
100 ACTIVE MATRIX SUBSTRATE
GL GATE BUS LINE
SL SOURCE BUS LINE
VL SIGNAL OUTPUT LINE
DL1 FIRST DRIVE SIGNAL LINE
DL2 SECOND DRIVE SIGNAL LINE
DL3 THIRD DRIVE SIGNAL LINE
DG1, DG1', DG2, DG2', DG3 DRIVE SIGNAL LINE GROUP
N1 NODE
DR DISPLAY REGION
FR PERIPHERAL REGION

The invention claimed is:

1. An active matrix substrate including a display region having a plurality of pixel regions and a peripheral region located in a periphery of the display region, the active matrix substrate comprising:
a substrate;
a plurality of gate bus lines and a plurality of source bus lines on the substrate;
a source driver disposed in the peripheral region and including a plurality of output terminals;
a plurality of signal output lines each connected to a corresponding one of the plurality of output terminals of the source driver; and
a demultiplexer circuit which includes a plurality of unit circuits supported by the substrate and which is disposed in the peripheral region, wherein
each of the plurality of unit circuits of the demultiplexer circuit distributes a display signal from one signal output line of the plurality of signal output lines to n source bus lines of the plurality of source bus lines, where n is an integer larger than or equal to 2,
each of the plurality of unit circuits includes
n branch lines connected to the one signal output line, and
n switching TFTs each connected to a corresponding one of the n branch lines, the n switching TFTs being configured to perform individual on/off control of electrical connections of the n branch lines to the n source bus lines,
the demultiplexer circuit further includes a plurality of boost circuits each configured to boost a voltage applied to a gate electrode of a corresponding one of the n switching TFTs,
each of the plurality of boost circuits includes
a set-and-reset unit configured to perform a set operation of pre-charging a node connected to the gate electrode and a reset operation of resetting potential of the node at different timings, and
a boost unit configured to perform a boost operation of boosting the potential of the node pre-charged by the set operation performed by the set-and-reset unit,
the demultiplexer circuit includes a first drive signal line and a second drive signal line via which a first drive signal and a second drive signal are respectively supplied to the set-and-reset unit,
the set-and-reset unit includes a setting-and-resetting TFT having a gate electrode connected to the second drive signal line, a source electrode, and a drain electrode, one of the source electrode and the drain electrode being connected to the first drive signal line, and the other of the source electrode and the drain electrode being connected to the node,
the setting-and-resetting TFT is configured to perform the set operation and the reset operation at different timings,
the setting-and-resetting TFT is in an ON state at a time of performing the set operation and at a time of performing the reset operation, and
the set-and-reset unit does not include any TFT other than the setting-and-resetting TFT.

2. The active matrix substrate according to claim 1, wherein
the demultiplexer circuit further includes a third drive signal line via which a third drive signal is supplied to the boost unit.

3. The active matrix substrate according to claim 2, wherein
the boost unit includes a boosting capacitive element having a first capacitance electrode connected to the third drive signal line and a second capacitance electrode connected to the node.

4. The active matrix substrate according to claim 3, wherein
the set-and-reset unit includes only one setting-and-resetting TFT.

5. The active matrix substrate according to claim 3, wherein
the first drive signal, the second drive signal, and the third drive signal each have a periodic waveform including a change from a low level to a high level and a change from the high level to the low level,
the set operation is performed when both the first drive signal and the second drive signal are at the high level,
the boost operation is performed when the third drive signal is at the high level, and
the reset operation is performed when the first drive signal is at the low level and the second drive signal is at the high level.

6. The active matrix substrate according to claim 2, wherein
the n switching TFTs included in each of the plurality of unit circuits include a first switching TFT and a second switching TFT which are brought into an ON state at different timings in one horizontal scan period, and
the plurality of boost circuits include a first boost circuit connected to the first switching TFT and a second boost circuit connected to the second switching TFT.

7. The active matrix substrate according to claim 6, wherein
the first drive signal line for the first boost circuit serves also as the second drive signal line for the second boost circuit, and
the first drive signal line for the second boost circuit serves also as the second drive signal line for the first boost circuit.

8. The active matrix substrate according to claim 6, wherein
within a time period during which the boost operation is performed by the boost unit of the first boost circuit, the set operation is performed by the set-and-reset unit of the second boost circuit.

9. The active matrix substrate according to claim 2, wherein
the first drive signal, the second drive signal, and the third drive signal each have a periodic waveform including a change from a low level to a high level and a change from the high level to the low level, and
one period of the periodic waveform is a time corresponding to one horizontal scan period.

10. The active matrix substrate according to claim 2, wherein
the first drive signal, the second drive signal, and the third drive signal each have a periodic waveform including a change from a low level to a high level and a change from the high level to the low level, and
one period of the periodic waveform is a time corresponding to two horizontal scan periods.

11. The active matrix substrate according to claim 2, wherein
the demultiplexer circuit further includes a plurality of clear circuits each connected to a corresponding one of the plurality of boost circuits and each configured to initialize the corresponding one of the plurality of boost circuits at a prescribed timing,
each of the plurality of clear circuits includes a clearing TFT including a gate electrode to which a clear signal is supplied, and a source electrode and a drain electrode, one of the source electrode and the drain electrode being connected to the node, and the other of the source electrode and the drain electrode being connected to the first drive signal line.

12. The active matrix substrate according to claim 1, wherein
each of the plurality of boost circuits performs, prior to the reset operation, pull-down operation of pulling down the potential of the node boosted by the boost operation to the potential achieved when the node is pre-charged by the set operation.

13. The active matrix substrate according to claim 1, wherein
the n switching TFTs included in each of the plurality of unit circuits are two switching TFTs, and
the plurality of boost circuits each include two boost circuits each of which is connected to a corresponding one of the two switching TFTs.

14. The active matrix substrate according to claim 1, wherein
the n switching TFTs included in each of the plurality of unit circuits are two switching TFTs,
the two switching TFTs are a first switching TFT and a second switching TFT which are brought into an ON state at different timings in one horizontal scan period, and
the plurality of boost circuits include a first boost circuit commonly connected to the first switching TFTs of two unit circuits of the plurality of unit circuits and a second boost circuit commonly connected to the second switching TFTs of the two unit circuits.

15. The active matrix substrate according to claim 1, wherein
the n switching TFTs included in each of the plurality of unit circuits are two switching TFTs, the two switching TFTs are a first switching TFT and a second switching TFT which are brought into an ON state at different timings in one horizontal scan period, and
the plurality of boost circuits include a first boost circuit commonly connected to the first switching TFTs of three or more unit circuits of the plurality of unit circuits and a second boost circuit commonly connected to the second switching TFTs of the three or more unit circuits.

16. The active matrix substrate according to claim 1, wherein
the n switching TFTs included in each of the plurality of unit circuits are three switching TFTs,
each of the plurality of unit circuits includes three boost circuits of the plurality of boost circuits, and
each of the three boost circuits is connected to a corresponding one of the three switching TFTs.

17. The active matrix substrate according to claim 1, wherein
the n switching TFTs included in each of the plurality of unit circuits are three switching TFTs,
the three switching TFTs are a first switching TFT, a second switching TFT, and a third switching TFT which are brought into an ON state at different timings in one horizontal scan period, and
the plurality of boost circuits include
a first boost circuit commonly connected to the first switching TFTs of two unit circuits of the plurality of unit circuits,
a second boost circuit commonly connected to the second switching TFTs of the two unit circuits, and
a third boost circuit commonly connected to the third switching TFTs of the two unit circuits.

18. The active matrix substrate according to claim 1, wherein
the n switching TFTs included in each of the plurality of unit circuits are three switching TFTs,
the three switching TFTs are a first switching TFT, a second switching TFT, and a third switching TFT which are brought into an ON state at different timings in one horizontal scan period, and
the plurality of boost circuits include
a first boost circuit commonly connected to the first switching TFTs of three or more unit circuits of the plurality of unit circuits,
a second boost circuit commonly connected to the second switching TFTs of the three or more unit circuits, and
a third boost circuit commonly connected to the third switching TFTs of the three or more unit circuits.

19. The active matrix substrate according to claim 1, wherein
the demultiplexer circuit further includes a plurality of clear circuits each connected to a corresponding one of the plurality of boost circuits and each configured to initialize the corresponding one of the plurality of boost circuits at a prescribed timing.

20. The active matrix substrate according to claim 1, wherein
the plurality of boost circuits include two or more boost circuits which are driven at the same timing, and
the demultiplexer circuit includes
a first drive signal line group via which a drive signal group for driving some boost circuits of the two or more boost circuits is supplied and
a second drive signal line group via which a drive signal group for driving some other boost circuits of the two or more boost circuits is supplied, the second drive signal line group being different from the first drive signal line group.

21. The active matrix substrate according to claim 1, wherein
each of the n switching TFTs includes an oxide semiconductor layer as an active layer.

22. The active matrix substrate according to claim 21, wherein
the oxide semiconductor layer includes an In—Ga—Zn—O-based semiconductor.

23. A display device comprising the active matrix substrate according to claim 1.

* * * * *